United States Patent
Hirano

(10) Patent No.: US 9,047,554 B2
(45) Date of Patent: Jun. 2, 2015

(54) IMAGE PROCESSING APPARATUS AND PROGRAM

(71) Applicant: Oki Data Corporation, Minato-ku, Tokyo (JP)

(72) Inventor: Yuji Hirano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/871,120

(22) Filed: Apr. 26, 2013

(65) Prior Publication Data

US 2013/0286422 A1 Oct. 31, 2013

(30) Foreign Application Priority Data

Apr. 27, 2012 (JP) .................. 2012-102375

(51) Int. Cl.
- G06F 3/12 (2006.01)
- G06K 15/02 (2006.01)
- G06T 11/00 (2006.01)
- G06T 11/60 (2006.01)

(52) U.S. Cl.
CPC ........ G06K 15/1872 (2013.01); G06K 15/1849 (2013.01); G06T 11/00 (2013.01); G06T 11/60 (2013.01)

(58) Field of Classification Search
CPC ....................................... G06F 17/211
USPC ................. 358/1.13, 1.15; 715/234, 243
See application file for complete search history.

(56) References Cited

FOREIGN PATENT DOCUMENTS

| JP | 2006-235855 A | 9/2006 |
|---|---|---|
| WO | WO 9919830 A1 * | 4/1999 |

* cited by examiner

*Primary Examiner* — Jacky X Zheng
(74) *Attorney, Agent, or Firm* — Panitch Schwarze Belisario & Nadel LLP

(57) ABSTRACT

Where plural rectangle drawing objects are provided in an overlapping manner in plural layers each having a different density, an intermediate code producing unit produces plural divisional objects upon dividing a region into prescribed pixel region units at each layer. The divisional object of a lower layer is set as a lower divisional object whereas the divisional object of a layer upper than the lower divisional object is set as an upper divisional object. The invented apparatus omits production of the intermediate code of the lower divisional object completely hiding under the upper divisional object and performs production of the intermediate code of the lower divisional object having a region protruding from the upper divisional object, at each of the prescribed pixel regions from the bottommost layer to the topmost layer.

7 Claims, 15 Drawing Sheets

1000 GRADATION PATTERN

FIG.5
(a)
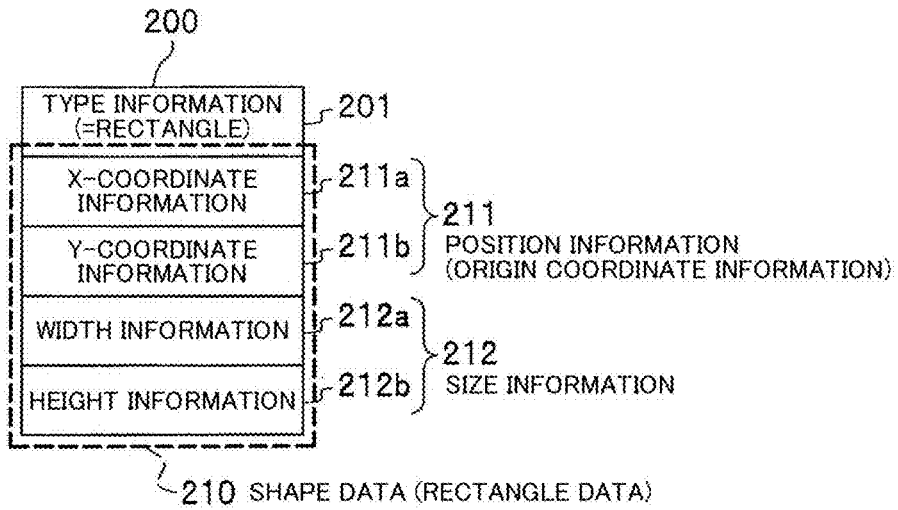
(b)
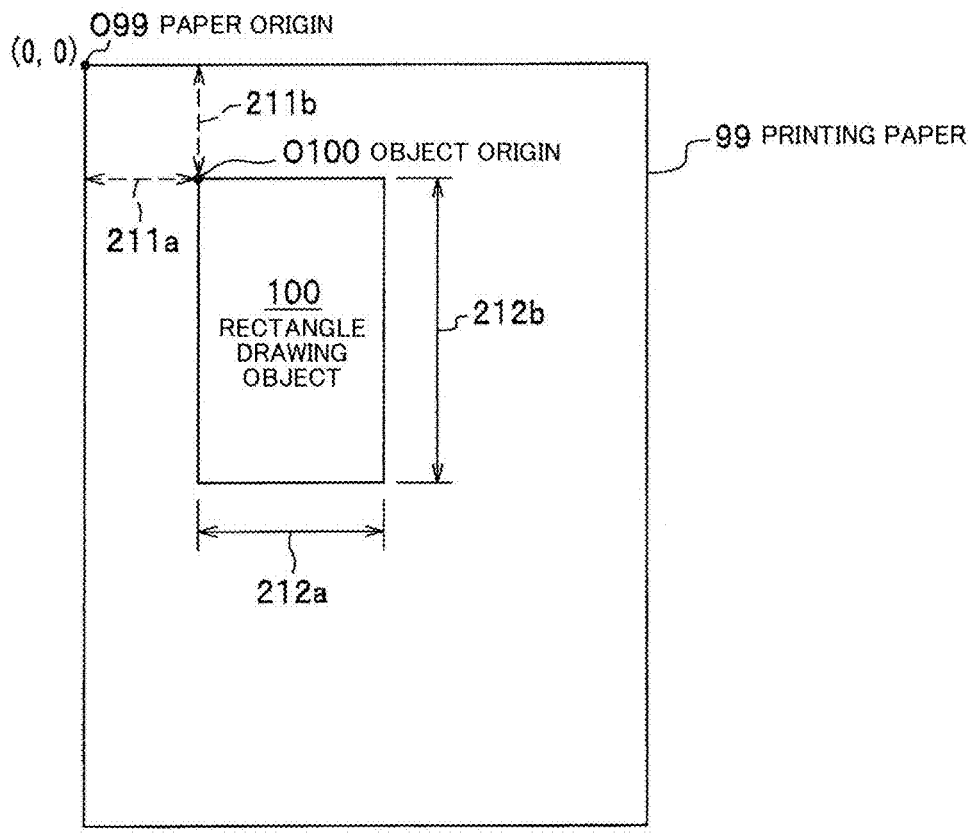

FIG.13
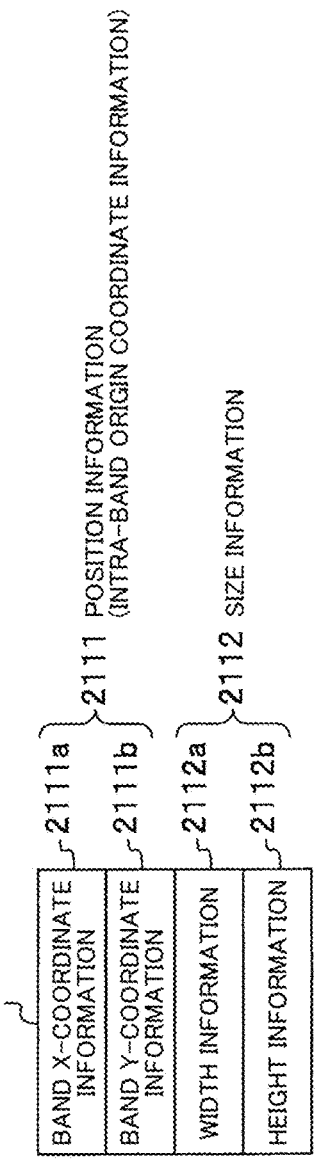
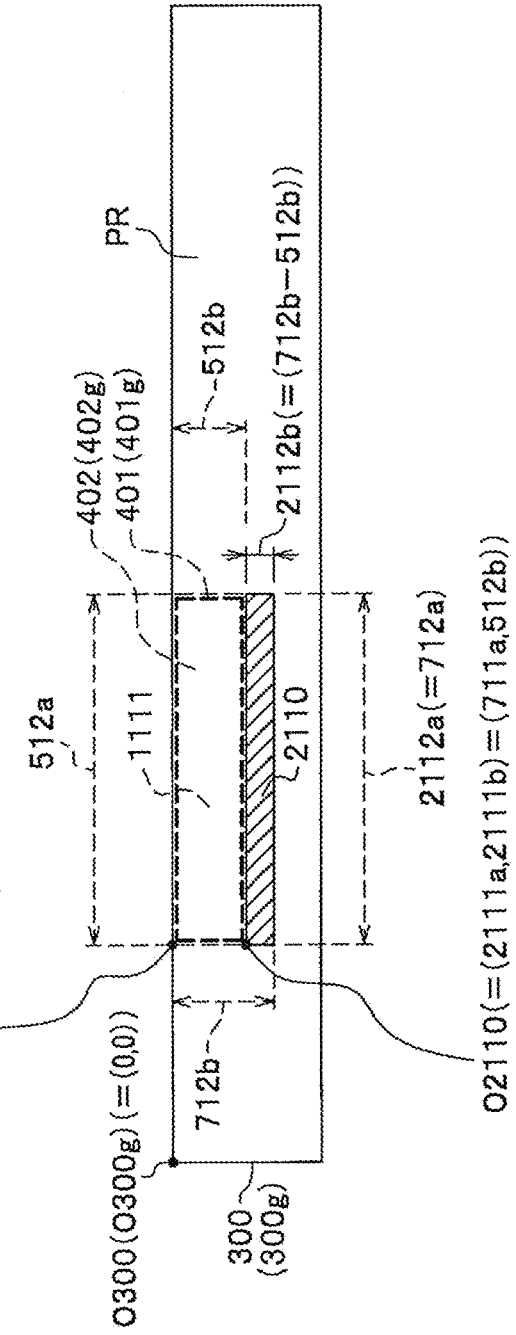

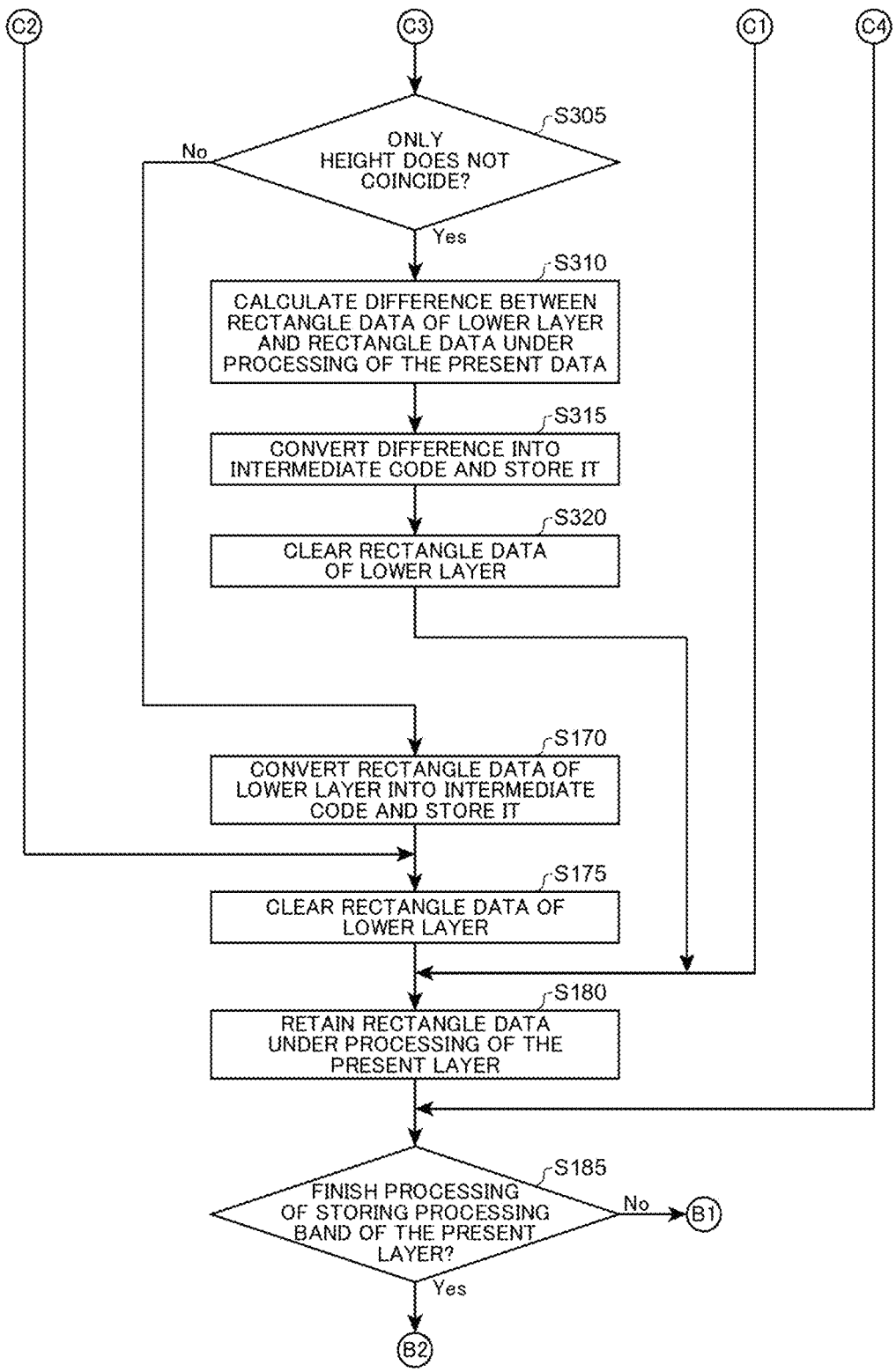

IMAGE PROCESSING APPARATUS AND PROGRAM

CROSS REFERENCE TO RELATED APPLICATION

This application claims priority benefits under 35 USC, section 119 on the basis of Japanese Patent Application No. 2012-102375, the disclosure of which is incorporated herein by reference.

BACKGROUND OF THE INVENTION

1. Field of the Invention

This invention relates to an image processing apparatus drawing, based on PDL commands, gradation patterns in which plural shape drawing objects each having a density different from each other are overlapped and, more particularly, to an image processing apparatus realizing drawing processing for gradation patters with higher speed. This invention also relates to a program realizing this image processing apparatus.

2. Background of Related Art

Image processing apparatuses have been aiming at higher speed gradation pattern drawing processing by converting respective drawing commands to a drawing command for gradation pattern upon combining the drawing commands in a case where drawing a gradation pattern in which color changes gradually in a continuous direction based on drawing commands obtained from a host apparatus (see, e.g., Japanese Patent Application Publication No. 2006-235,855).

In drawing the gradation pattern, however, such an apparatus uses various types of PDL (Page Description Language) commands in accordance with application software to be used. With such an image processing apparatus of a prior art, there raises a problem that the apparatus is unable to perform high speed drawing processing for gradation patterns because of having no adjacent relationship among respective shape drawing objects to be drawn, in a case of using, e.g., a PDL command drawing a gradation pattern upon overlapping shape drawing objects of several tens while changing the density gradually.

SUMMARY OF THE INVENTION

For solving the above problems, it is an object of the invention to provide an image processing apparatus realizing processing for drawing gradation patterns with higher speed in a case that gradation patterns are drawn in changing the density gradually as overlapping shape drawing objects of several tens based on the PDL commands. It is another object of the invention to provide a program realizing such an image processing apparatus.

To achieve the above object, an invented image processing apparatus producing image data, includes a language analyzing unit for analyzing a PDL command, a shape drawing unit producing a shape drawing object based on a shape drawing command contained in the analyzed PDL command, an intermediate code producing unit producing an intermediate code based on the position and size of the shape drawing object, and an image data producing unit for producing the image data based on the intermediate code, wherein, in a case that the plurality of the shape drawing objects are a plurality of rectangle drawing objects provided as plural layers in an overlapping manner each having a density different from each other for forming a gradation pattern, the intermediate code producing unit produces a plurality of divisional objects upon dividing a region including the rectangle drawing object into prescribed pixel region units at each layer, wherein the divisional object whose layer is located on a lower side is set as a lower divisional object whereas the divisional object whose layer is located on an upper side than the lower divisional object is set as an upper divisional object, and wherein processing of omitting production of the intermediate code of the lower divisional object completely hiding under the upper divisional object and of performing production of the intermediate code of the lower divisional object having a region protruding from the upper divisional object, is made at each of the prescribed pixel regions from the bottommost layer to the topmost layer.

This image processing apparatus is structured to omit production of the intermediate code of the lower divisional object completely hiding under the upper divisional object and to perform production of the intermediate code of the lower divisional object having a region protruding from the upper divisional object. Because this image processing apparatus omits production of intermediate code of the lower divisional object completely hiding under the upper divisional object, the image processing apparatus can reduce the production time of the image data including gradation patterns, so that the apparatus can realize the processing of drawing the gradation patterns with higher speed.

In another aspect of the invention, an image processing apparatus producing image data, includes a language analyzing unit for analyzing a PDL command, a shape drawing unit producing a shape drawing object based on a shape drawing command contained in the analyzed PDL command, an intermediate code producing unit producing an intermediate code based on the position and size of the shape drawing object, and an image data producing unit for producing the image data based on the intermediate code, wherein, in a case that the plurality of the shape drawing objects are a plurality of rectangle drawing objects provided as plural layers in an overlapping manner each having a density different from each other for forming a gradation pattern, the intermediate code producing unit produces a plurality of divisional objects upon dividing a region including the rectangle drawing object into prescribed pixel region units at each layer, wherein the divisional object whose layer is located on a lower side is set as a lower divisional object whereas the divisional object whose layer is located on an upper side than the lower divisional object is set as an upper divisional object, and wherein processing of omitting production of the intermediate code of the lower divisional object having a region hiding under the upper divisional object and of performing production of the intermediate code of the lower divisional object having a region protruding from the upper divisional object, is made at each of the prescribed pixel regions from the bottommost layer to the topmost layer.

This image processing apparatus is structured to perform production of the intermediate code of the lower divisional object protruding from the upper divisional object and to omit production of the intermediate code of the lower divisional object hiding under the upper divisional object. Because this image processing apparatus omits production of intermediate code of the lower divisional object hiding under the upper divisional object, the image processing apparatus can reduce the production time of the image data including gradation patterns, so that the apparatus can realize the processing of drawing the gradation patterns with higher speed.

In yet another aspect of the invention, an invented program for rendering a controller for controlling an image processing apparatus producing image data, functions as a language analyzing unit for analyzing a PDL command, a shape drawing unit producing a shape drawing object based on a shape drawing command contained in the analyzed PDL command, an intermediate code producing unit producing an intermediate code based on the position and size of the shape drawing object, the intermediate code producing unit producing, in a case that the plurality of the shape drawing objects are a plurality of rectangle drawing objects provided as plural layers in an overlapping manner each having a density different from each other for forming a gradation pattern, a plurality of divisional objects upon dividing a region including the rectangle drawing object into prescribed pixel region units at each layer, wherein the divisional object whose layer is located on a lower side is set as a lower divisional object whereas the divisional object whose layer is located on an upper side than the lower divisional object is set as an upper divisional object, and wherein processing of omitting production of the intermediate code of the lower divisional object hiding under the upper divisional object and of performing production of the intermediate code of the lower divisional object having a region protruding from the upper divisional object, is made at each of the prescribed pixel regions from the bottommost layer to the topmost layer, and an image data producing unit for producing the image data based on the intermediate code.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 5 is a diagram showing a structure of shape drawing object information used in the first embodiment;

FIG. 13 is a diagram showing a structure of difference rectangle data used in the second embodiment;

FIG. 15B is a flowchart #2 showing operation of the image processing apparatus according to the second embodiment.

DETAILED DESCRIPTION OF THE INVENTION

Figure 1:
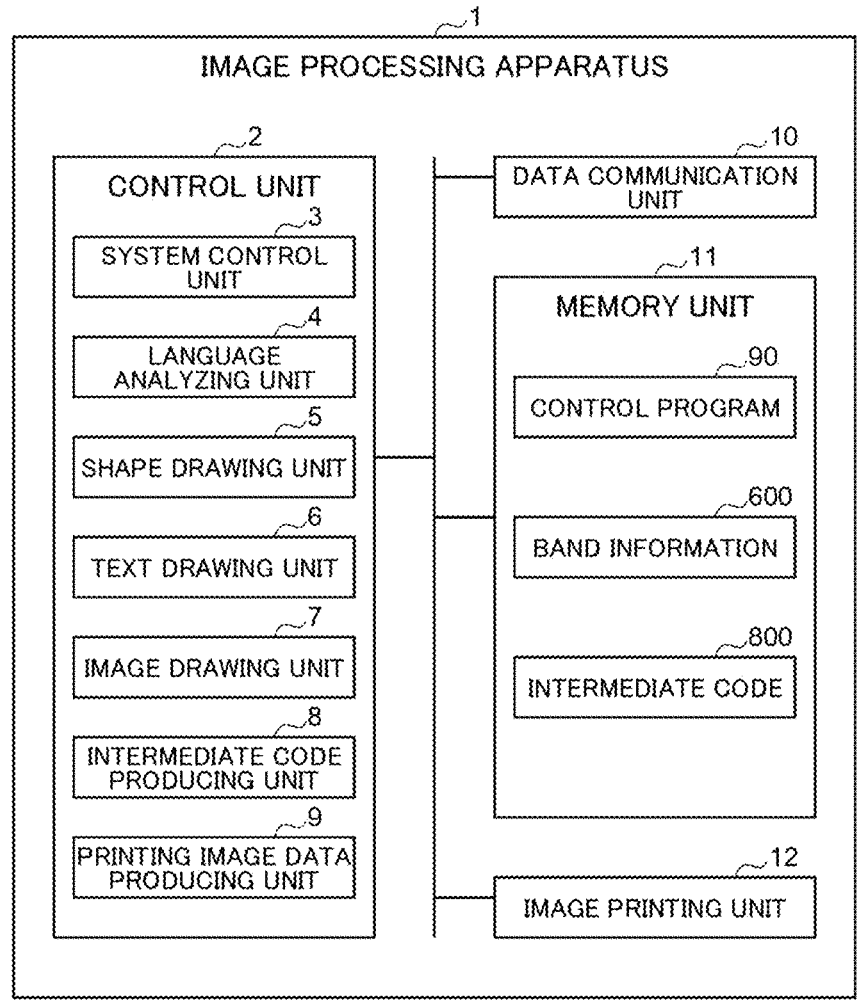
FIG. 1 is a block diagram showing a structure of an image processing apparatus according to a first embodiment of the invention.

Referring to the drawings, hereinafter, embodiments according to the invention are described in detail. It is to be noted that each drawing is merely shown schematically so as to make this invention understood adequately, and thus, this invention is not limited to the illustrated examples. Common or similar structural elements are given with the same reference numbers to avoid their duplicated explanations.

First Embodiment

Figure 2:
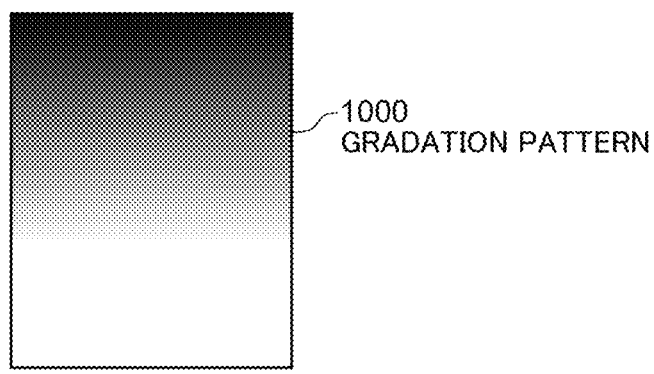
FIG. 2 is a diagram showing an example of a gradation pattern drawn by the image processing apparatus according to the first embodiment.
Figure 4:
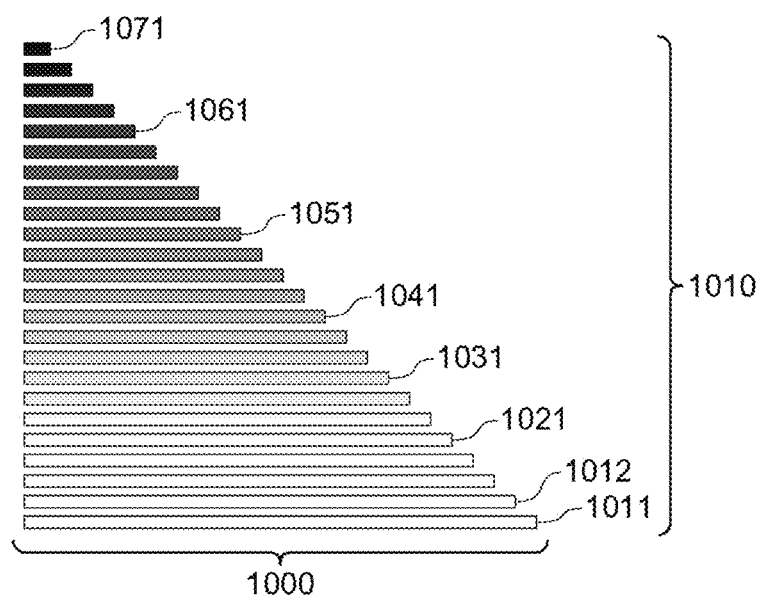
FIG. 4 is a diagram showing a cross-sectional structure of the gradation pattern.
Figure 10:
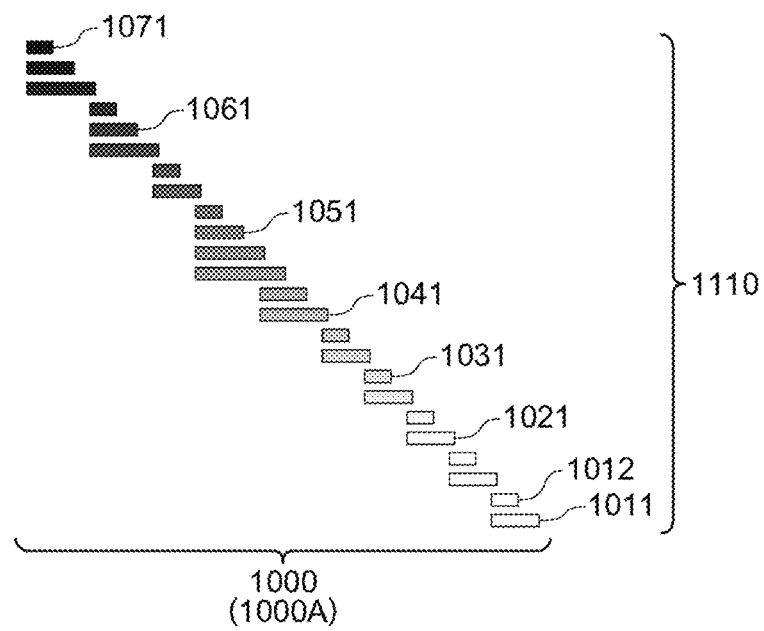
FIG. 10 is a diagram showing a cross-sectional structure of the gradation pattern drawn by the image processing apparatus according to the first embodiment.

An image processing apparatus 1 according to the first embodiment (see, FIG. 1) has a feature to draw a gradation pattern 1000 using not a rectangle drawing region 1010 shown in FIG. 4 but a rectangle drawing region 1110 shown in FIG. 10 as a rectangle drawing region structuring each layer of the gradation pattern 1000 (see, FIG. 2).

Structure of the Image Processing Apparatus

Hereinafter, referring to FIG. 1, the structure of the image processing apparatus 1 according to the first embodiment is described. FIG. 1 is a diagram showing the structure of the image processing apparatus 1 according to the first embodiment. The image processing apparatus is an apparatus drawing various images. It is assumed herein that the image processing apparatus 1 is structured as a page printer.

As shown in FIG. 1, the image processing apparatus 1 includes a control unit 2, a data communication unit 10, a memory unit 11, and an image printing unit (image forming unit) 12.

The control unit 2 is made of a CPU. The CPU, upon executing control program 90 previously stored in the memory unit 11, functions as a system control unit 3, a language analyzing unit 4, a shape drawing unit 5, a text drawing unit 6, an image drawing unit 7, an intermediate producing unit 8, and printing image data producing unit 9. The system control unit 3 is a functioning unit for controlling the entire image processing apparatus 1. The language analyzing unit 4 is a functioning unit for analyzing the received PDL commands.

The shape drawing unit 5 is a functioning unit for producing shape drawing objects for triangles, trapezoids, rectangles, etc. according to the PDL commands. The text drawing unit 6 is a functioning unit for producing text or letter drawing objects according to the PDL commands. The image drawing unit 7 is a functioning unit for producing image drawing objects for pictures, photos, etc. according to the PDL commands.

Figure 9:
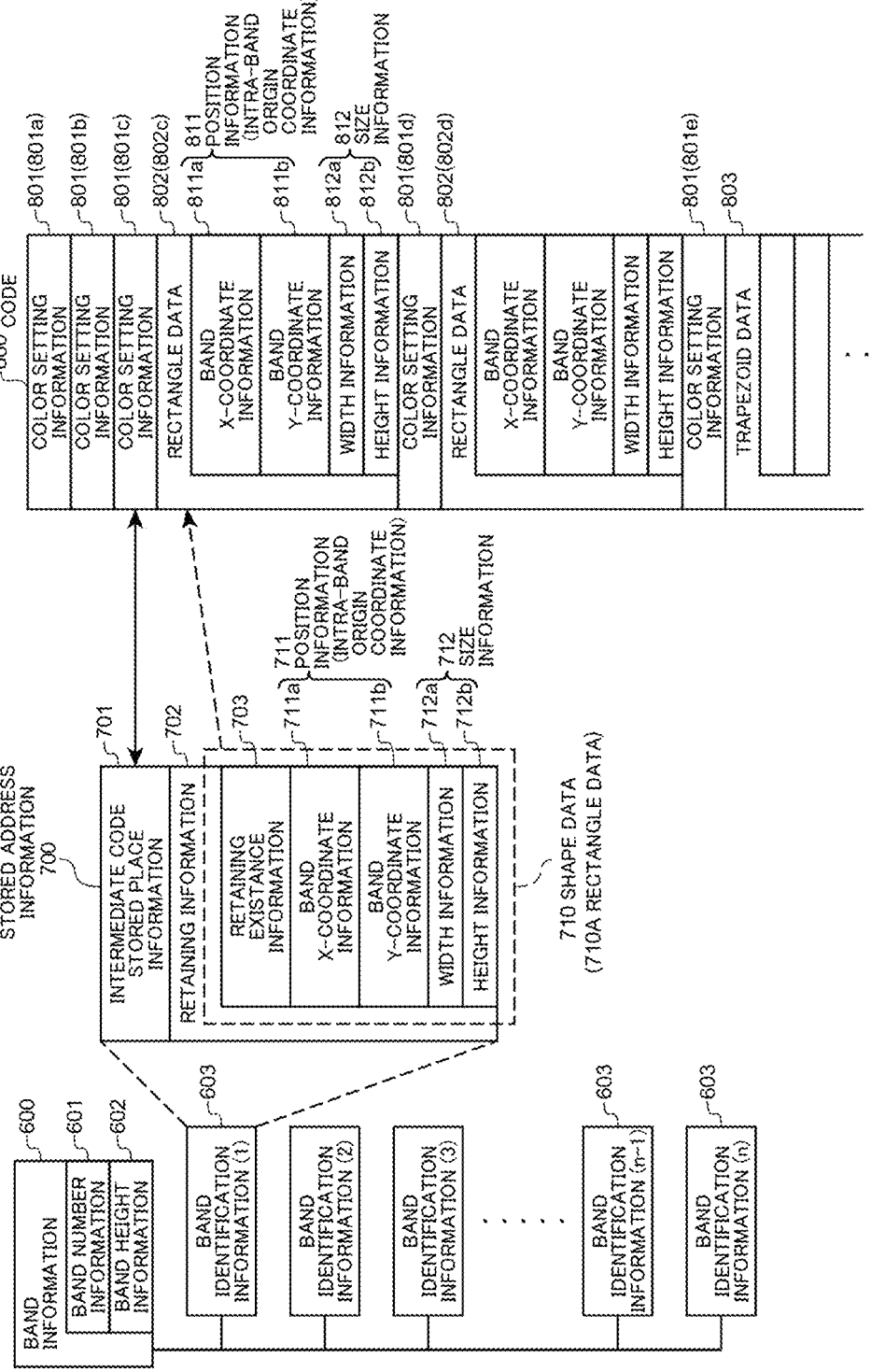
FIG. 9 is a diagram showing a structure of band information used in the first embodiment.

The intermediate code producing unit 8 is a functioning unit for converting information on drawing contents (namely, drawing objects), in particular, information indicating position and size of the drawing object, into intermediate codes 800 (see, FIG. 9). The printing image data producing unit 9 is a functioning unit for producing printing image data for printing the drawing objects on a printing paper 99 (see FIG. 5(b)). The printing image data producing unit 9 specifies the position and size of the drawing object based on the intermediate code 800 and produces the printing image data.

The data communication unit 10 is an interface for transmitting and receiving data to and from a host apparatus. The memory unit 11 is a memory unit for memorizing various programs and information. The memory unit 11 is made of RAMs, or flash memories, etc. The memory unit 11 stores, e.g., the control program 90 for controlling operation of the image processing apparatus 1, necessary information for executing the control program 90 such as band information 600 and the intermediate codes 800 as described below, received data, image data, etc. The image printing unit 12 is a structural element for printing images on the printing paper 99 (see, FIG. 5(b)).

The image processing apparatus 1 makes printing of various images on the printing paper 99 (see FIG. 5(b)) based on respective drawing commands retrieved from the host apparatus. It is described herein in assuming a situation that the image processing apparatus 1 prints on the printing paper 99 the gradation pattern 1000 (see FIGS. 2 to 4) with changing colors in a height direction where a feeding direction of the printing paper 99 is set as "the height direction" whereas the a direction perpendicular to the feeding direction is set as "the width direction."

Figure 3:
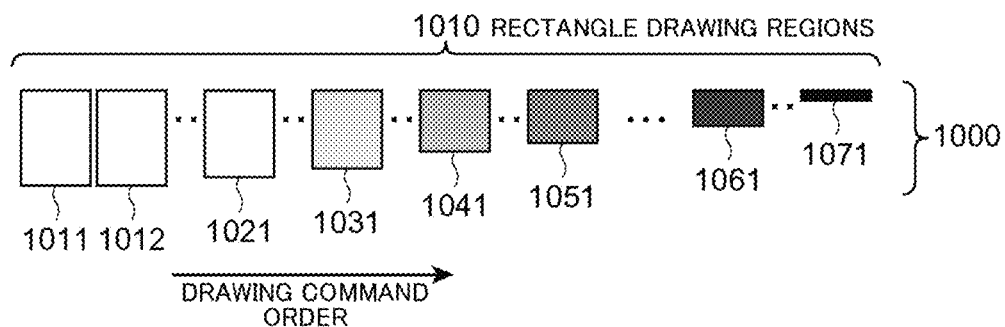
FIG. 3 is a diagram showing the plane structure of each layer of the gradation pattern.

FIG. 2 is a diagram showing an example of a gradation pattern 1000 drawn by the image processing apparatus 1 according to the first embodiment. The gradation pattern 1000 is constituted of rectangle drawing regions 1010 of several tens in an overlapping manner in an up and down direction. The respective rectangle drawing regions 1010, accordingly, are structured of respective layers of the gradation pattern 1000. FIG. 3 is a diagram showing the plane structure of each layer of the gradation pattern 1000. FIG. 4 is a diagram showing a cross-sectional structure of the gradation pattern.

In the example shown in FIG. 3 and FIG. 4, regions 1011 to 1071 are illustrated orderly from having a lower or thinner density to a higher or denser density, as an example of the rectangle drawing region 1010. The gradation pattern 1000 has respective rectangle drawing regions 1010 changing their density from lower to higher and being formed of overlapping layers in the up and down direction as narrower in its span. Accordingly, a portion having a high density of the gradation pattern 1000 is made of overlapped layers of the rectangle drawing regions 1010 of several tens.

It is to be noted that a gradation pattern 100 changing its color in the height direction, or namely the feeding direction of the printing paper 99, includes the rectangle drawing regions 1010 of respective layers having the same width component but the different height component.

The image processing apparatus 1 draws, for each layer of the gradation pattern 1000, the shape drawing objects structuring respective layers on a worki region in the memory unit 11 when the gradation pattern 1000 is printed on the printing paper 99.

At that time, in the image processing apparatus 1, the shape drawing unit 5 draws a rectangle drawing object 100 (see, FIG. 5(b)) as a shape drawing object. It is to be noted that the term "rectangle drawing object 100" is rectangle shape drawing object constituting the respective layers from the region 1011 to the region 1071 as the rectangle drawing regions 1010 shown in FIG. 3 and FIG. 4.

The shape drawing unit 5 produces information on the shape drawing objects to be drawn (hereinafter called to as "shape drawing object information 200" (see FIG. 5(a)) when the shape drawing object is drawn.

FIG. 5 is a diagram showing a structure of the shape drawing object information 200 used in the first embodiment. As shown in FIG. 5(a), the shape drawing object information 200 has a structure including type information 201 and shape data 210.

The type information 201 is formation indicating types of the shape of the shape drawing objects to be drawn. The type information 201 takes a value indicating "triangle," "rectangle," or "trapezoid" when the types of shapes are triangle, rectangle, or trapezoid, respectively.

The shape data 210 are information indicating the position and size of the shape drawing object to be drawn. The shape data 210 are formed in including position information 211 and size information 212.

The position information 211 is information indicating the position of the origin of the shape drawing object to be drawn. It is described herein in assuming that, where a left upper corner of the printing paper 99 is set as the origin of the printing paper 99 (hereinafter, referred to as "paper origin O99" in some cases), and where a left upper corner of the shape drawing object (rectangle drawing object 100 in the example shown in FIG. 5(b)) is set as the origin of the shape drawing object (hereinafter, referred to as "object origin O100" in some cases), the position information 211 is information indicating the coordinate of the object origin O with reference of the paper origin O99.

Hereinafter, the position information 211 is referred to as "origin coordinate information 211." The origin coordinate information 211 is made of an X-coordinate information 211*a* indicating the X-coordinate of the object origin O100 with reference to the paper origin O99, and a Y-coordinate information 211*b* indicating the Y-coordinate of the object origin O100 with reference to the paper origin O99, as shown in FIG. 5(a), where the coordinate of the paper origin is set as (0,0) as shown in FIG. 5(b).

The size information 212 is information indicating size of the shape drawing object to be drawn. It is described herein in assuming that the size information 212 is structured of width information 212*a* indicating a length of the width of the shape drawing object, and height information 212*b* indicating the height of the shape drawing object, as shown in FIG. 5(a).

It is to be noted that the contents of the shape drawing object information 200 are made different according to the types of the shape of the shape drawing object to be drawn. It is described herein in assuming that the type of the shape is rectangle (or namely, the shape drawing object to be drawn is the rectangle drawing object 100). The shape data 210 are hereinafter referred to as "rectangle data 210."

When producing the rectangle drawing object 100 serving as the shape drawing object, the image processing apparatus 1 divides the printing region PR in the printing paper 99 into prescribed pixel regions, which are so-called as "bands." It is described herein in assuming that the image processing apparatus 1 divides the printing region PR into prescribed constant-height units (hereinafter, referred to as "band unit") in a lateral direction.

It is to be noted that "the printing region PR" means a printable region. The image processing apparatus 1 prints various drawing objects (e.g., shape drawing objects such as triangles, trapezoids, rectangles, etc., text drawing objects, and image drawing objects such as pictures, photos, etc.) to the printing region PR based on the drawing command contained in the PDL command received from the host apparatus not shown.

Figure 6:
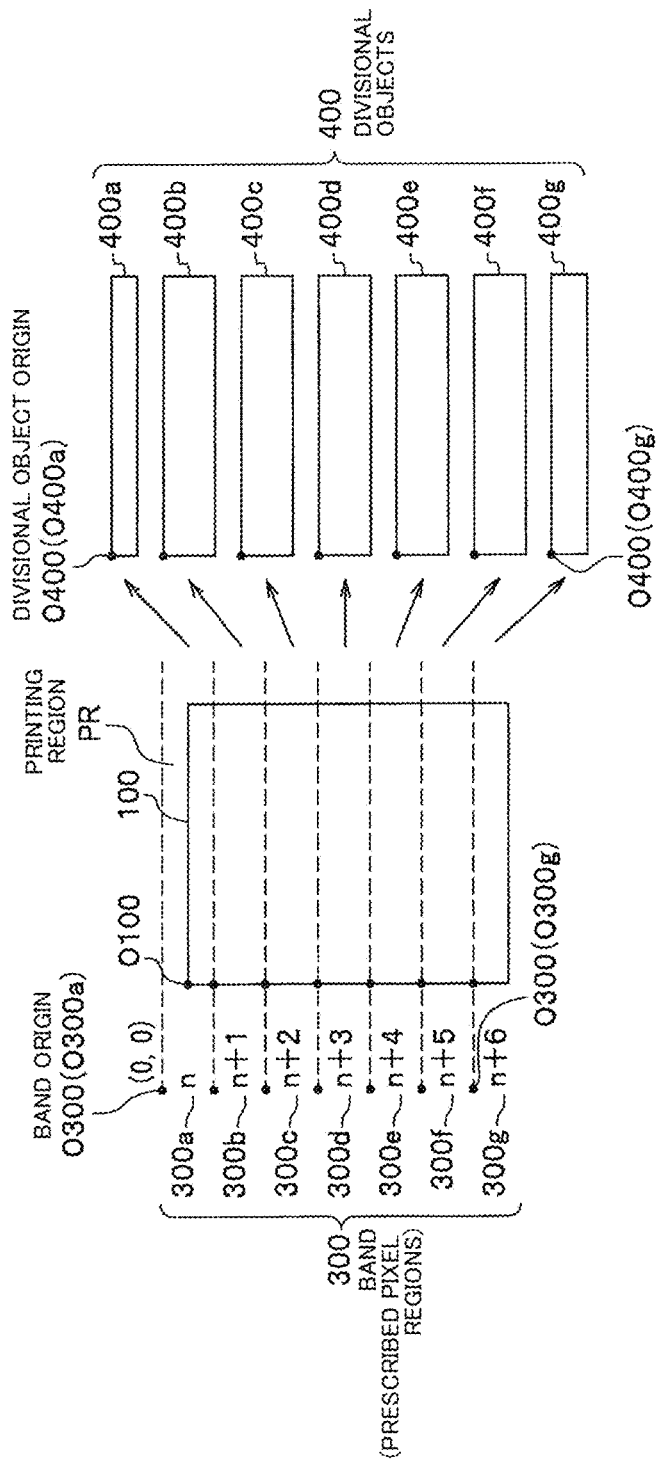
FIG. 6 is a diagram showing operation at a time dividing a rectangle drawing object of the image processing apparatus according to the first embodiment.

The image processing apparatus 1 divides the shape drawing object (or the rectangle drawing object 100 herein) into the band units as shown in FIG. 6 when dividing the printing region PR into the band units. FIG. 6 is a diagram showing operation of the image processing apparatus 1 according to the first embodiment during division of the rectangle drawing object 100.

In the example shown in FIG. 6, the image processing apparatus 1 divides the rectangle drawing object 100 into the band units of seven bands 300 from a band 300a to a band 300g. Hereinafter, the shape drawing object (or the rectangle drawing object 100 herein) divided into the band units is called to as "divisional object 400."

In the example shown in FIG. 6, the image processing apparatus 1 produces seven divisional objects 400 from the divisional object 400a to the divisional object 400g respectively corresponding to the seven bands 300 from the band 300a to the band 300g.

The image processing apparatus 1 produces data indicating the position and size of the respective divisional objects 400 in the band 300 (hereinafter referred to as "rectangle data 500" (see, Fig. (a))) for each band 300 when dividing the shape drawing object (or the rectangle drawing object 100 herein) into the band units.

Figure 7:
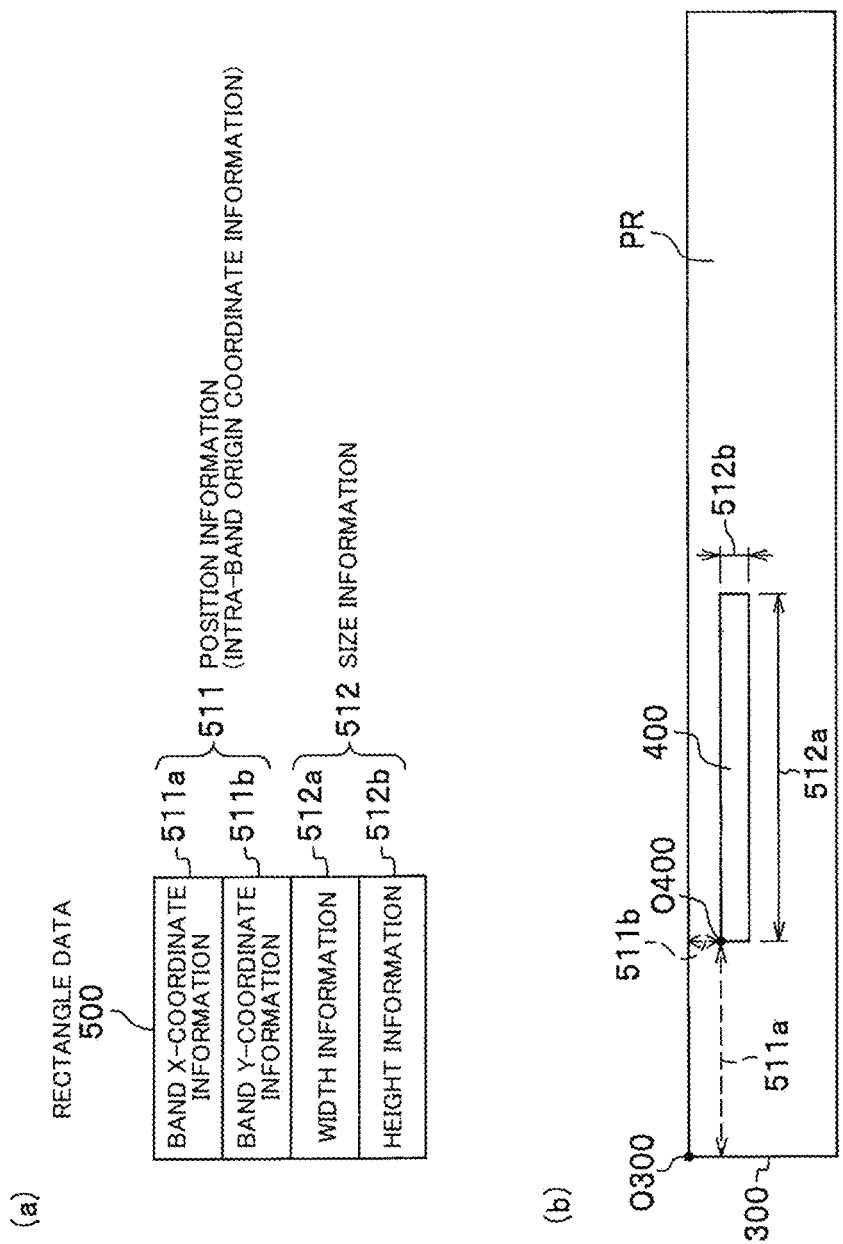
FIG. 7 is a diagram showing a structure of rectangle data used in the first embodiment.

FIG. 7 is a diagram showing a structure of the rectangle data 500 used in the first embodiment. FIG. 7(a) shows the structure of the rectangle data 500; FIG. 7(b) shows the structure of the divisional object 400 corresponding to the rectangle data 500. As shown in FIG. 7(a), the rectangle data 500 have a structure containing position information 511 and size information 512.

The position information 511 is information indicating the position of the origin in the band 300 of the respective divisional objects 400. It is described herein in assuming that, where a left upper corner of the band 300 is set as the origin of the band 300 (hereinafter, referred to as "band origin O300" in some cases), and where a left upper corner of the divisional object 400 is set as the origin of the divisional object 400 (hereinafter, referred to as "divisional object origin O400" in some cases), the position information 511 is information indicating the coordinate of the divisional object origin O400 with reference of the band origin O300.

Hereinafter, the position information 511 is referred to as "intra-band origin coordinate information 511." The intra-band origin coordinate information 511 is made of an X-coordinate information 511a indicating the X-coordinate of the divisional object origin O400 with reference to the band origin O300, and a Y-coordinate information 511b indicating the Y-coordinate of the divisional object origin O400 with reference to the band origin O300, as shown in FIG. 7(a), where the coordinate of the band origin O300 is set as (0,0) as shown in FIG. 6. Hereinafter, the X-coordinate information 511a may be referred to as "band X-coordinate information 511a," whereas the Y-coordinate information 511b may be referred to as "band Y-coordinate information 511b.

The size information 512 is information indicating size of the respective divisional objects 400. It is described herein in assuming that the size information 512 is structured of width information 512a indicating a length of the width of the divisional object, and height information 512b indicating the height of the divisional object, as shown in FIG. 7(a).

Production of the rectangle data 500 is performed by the image processing apparatus 1 through calculating the intra-band origin coordinate information 511 (see FIG. 7(a)) and the size information 512 (see FIG. 7(a)) for each of the divisional objects 400.

The image processing apparatus 1 produces intermediate codes 800 by converting the rectangle data 500 into the intermediate codes 800 (see FIG. 9) at a prescribed timing when producing the rectangle data 500.

The image processing apparatus 1 at that time judges as to whether the respective divisional objects 400 coincide to a prescribed condition and omits the production of the intermediate code 800 corresponding to the divisional object 400 coinciding to the prescribed condition in a case of coinciding.

Figure 8:
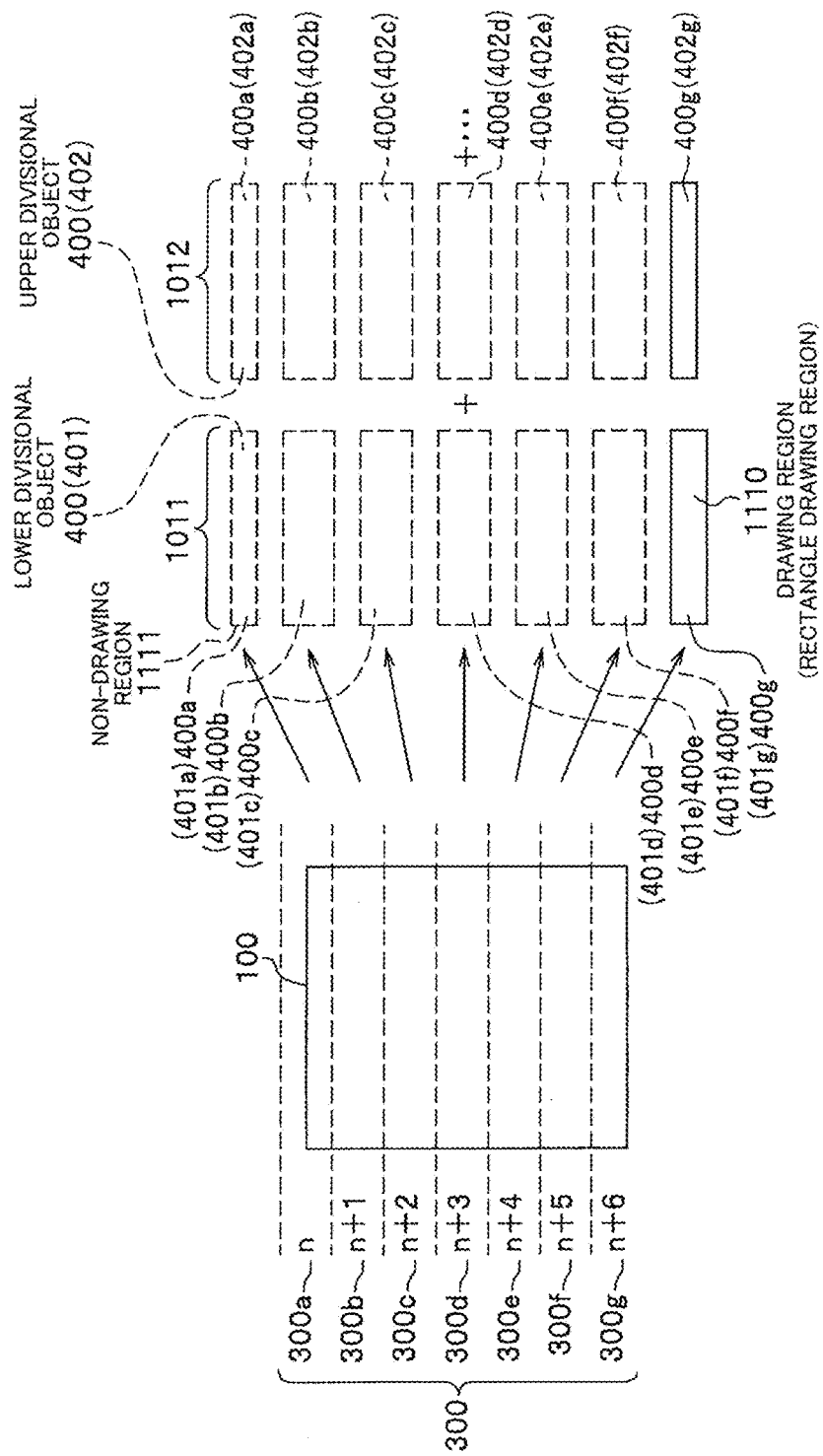
FIG. 8 is a diagram showing operation at a time producing intermediate codes of the image processing apparatus according to the first embodiment.

It is described herein in assuming that completely overlapping between the lower divisional object 401 and the upper divisional object 402 as shown in FIG. 8 makes "a prescribed condition" for omitting production of the intermediate code 800.

It is to be noted that the "lower divisional object 401" herein means the divisional object 400 constituting a lower layer of the gradation pattern 1000 (see FIG. 3 and FIG. 4). The "upper divisional object 402" means the divisional object 400 constituting a layer located upper than the lower divisional object 400 of the gradation pattern 1000, The term of "completely overlapping of the lower divisional object 401 and the upper divisional object 402" means that both of the position and size coincide to each other between the lower divisional object 401 and the upper divisional object 402 within the prescribed pixel region (or herein, within a certain band 300).

FIG. 8 is a diagram showing operation of the image processing apparatus 1 according to the first embodiment during production of the intermediate code 800. FIG. 8 shows, in a comparing manner, structures of the lower divisional object 401 (i.e., lower divisional objects 401a to 401g in the drawing) forming a layer of the region 1011 of the gradation pattern 1000 (see FIG. 3, FIG. 4) and of the upper divisional object 402 (i.e., upper divisional objects 402a to 402g in the drawing) forming a layer of the region 1012. It is to be noted that the gradation pattern 1000 is structured of the regions 1011, 1012, . . . of several tens overlapping with each other and constituting the respective layers.

The lower divisional objects 401a to 401g and the upper divisional objects 402a to 402g are categorized into either of drawing regions 1110 shown with a solid line in FIG. 8 and non-drawing regions 1111 shown with a dot line in FIG. 8, respectively.

All or a part of the drawing region 1110 is a region protruding out of the region of the divisional object 400 of other layers (or the upper divisional object 402) and exposing itself outside. The drawing region 1110 is a region unable to omit production of the intermediate code 800 because drawing is inevitable.

To the contrary, the non-drawing region 1111 is a region in which all of the region is hiding completely under the divisional object 400 of other layers (or the upper divisional object 402). The non-drawing region 1111 is a region able to omit production of the intermediate code 800 because drawing is unnecessary.

The divisional object 400 becomes the "drawing region 1110" in a case that all or a part of the region is made exposed outside. The divisional object 400 also becomes the "non-drawing region 1111" in a case that all of the region is hiding completely under the divisional object 400 of other layers (or the upper divisional object 402).

More specifically, the lower divisional object 401 is hiding completely under the upper divisional object 402 in a case that its position coincides to the position of the upper divisional object 402 while its size coincides to the size of the upper divisional object 402 within the same band 300. In such a case, the lower divisional object 401 becomes the non-drawing region 1111.

A part of the lower divisional object 401 protrudes out of the region of the upper divisional object 402 and comes to expose itself outside in a case other than the above case (i.e., a case that within the same band 300, the position does not coincides to the position of the upper divisional object 402, or the size does not coincides to the size of the upper divisional object 402). In such a case, the lower divisional object 401 becomes the drawing region 1110.

For example, in the example shown in FIG. 8, the lower divisional objects 401a to 401g are shown as the lower divisional objects 401, and the upper divisional objects 402a to 402g are shown as the upper divisional object 402.

The lower divisional objects 401a to 401g and the upper divisional objects 402a to 402g have the same position between the corresponding divisional objects 400 (i.e., more specifically, the respective positions of the origin O400 (see, FIG. 6) within each band 300 coincide to one another).

The lower divisional objects 401a to 401f and the upper divisional objects 402a to 402f have the same width and the same height, correspondingly. Accordingly, in the example shown in FIG. 8, the lower divisional objects 401a to 401f become the non-drawing regions 1111.

To the contrary, the lower divisional object 401g and the upper divisional object 402g have the same length of width but have heights different from one another. In the example shown in FIG. 8, therefore, the lower divisional objects 401g become the drawing region 1110.

The image processing apparatus 1 performs processing that the lower divisional object 401 having the position and size coinciding to those of the upper divisional object 402 in the prescribed pixel region, or namely in the same band 300 herein, is treated as the non-drawing region 1111 and that the lower divisional object 401 other than that is treated as the drawing region 1110. The image processing apparatus 1 omits production of the intermediate code 800 (see FIG. 9) to the non-drawing region 1111 and produces the intermediate code 800 only to the drawing region 1110. The image processing apparatus 1 repeats such a processing from the bottommost layer, or the region 1011 (see FIG. 4), to the topmost layer, or the region 1071 (see FIG. 4).

In a case that the upper divisional object 402 becomes the divisional object 400 of the topmost layer, the entire region of the upper divisional object 402 comes to expose itself outside. In such a case, all region of the upper divisional object 402 becomes the drawing region 1110.

When producing the divisional object 400, the image processing apparatus 1 also produces information about the respective bands 300, and stores the information in the memory unit 11. FIG. 9 is a diagram showing the structure of the band information 600 used in the first embodiment. In the example shown in FIG. 9, the band information 600 includes band number information 601, band height information 602, and band identification information 603.

The band number information 601 is information indicating number of the band 300 for one page. The band height information 602 is information indicating height of each band 300. The band identification information 603 is information particular to each band 300. The band identification information 603 includes information of the bands of the number corresponding to the band number information 601 to be stored in the memory unit 11. The band identification information 603 has a structure including stored address information 700.

The stored address information 700 is information indicating an address storing the intermediate code 800 in the memory unit 11. The stored address information 700 has a structure including intermediate code stored place information 701 and retaining information 702.

The intermediate code stored place information 701 is information indicating an address storing the intermediate code 800 in the memory unit 11. Detail of the intermediate code 800 will be described below. The retaining information 702 is information retained (or temporarily stored) in the memory unit 11 and referred when the intermediate code 800 is produced. The retaining information 702 has a structure including retaining existence information 703 and shape data 710.

The retaining existence information 703 is information indicating as to whether any shape data 710 to be converted into the intermediate code 800 are retained (or temporarily stored) in the memory unit 11. The retaining existence information 703 takes its value of a state of "retaining" in a case that shape data 710 to be converted into the intermediate code 800 are retained in the memory unit 11, and conversely, takes its value of a state of "not retaining" in a case that shape data 710 to be converted into the intermediate code 800 are not retained in the memory unit 11.

The shape data 710 are information indicating the position and size of the shape drawing object to be drawn. The shape data 710 are herein referred to as "rectangle data 710A" in a case where the type of the shape of the shape drawing object to be drawn is rectangle. The shape data 710 have a structure including the position information 711 and the size information 712.

The position information 711 is information corresponding to the intra-band origin coordinate information 511 (see, FIG. 7(a)), and indicates the origin position in the band 300 of the respective divisional objects 400, in substantially the same way as the intra-band origin coordinate information 511. The position information 711 indicates the coordinate of the divisional object origin O400 with reference to the band origin O300, in substantially the same way as the intra-band origin coordinate information 511.

Hereinafter, the position information 711 is referred to as "intra-band origin coordinate information 711." The intra-band origin coordinate information 711 is structured of an X-coordinate information 711a and a Y-coordinate information 711b as shown in FIG. 9. The X-coordinate information 711a is information corresponding to the X-coordinate information 511a (see FIG. 7(a)), and indicates the X-coordinate of the divisional object origin O400 with reference to the band origin O300, in substantially the same way as the X-coordinate information 511a. The Y-coordinate information 711b is information corresponding to the Y-coordinate information 511b (see FIG. 7(a)), and indicates the Y-coordinate of the divisional object origin O400 with reference to the band origin O300, in substantially the same way as the Y-coordinate information 511b. Hereinafter, the X-coordinate information 711a may be referred to as "the band X-coordinate information 711a" whereas the Y-coordinate information 711b may be referred to as "the band Y-coordinate information 711b."

The size information 712 is information corresponding to the size information 512 (see FIG. 7(a)), and indicates the size of the respective divisional objects 400, in substantially the same way as the size information 512. The size information 712 is structured of width information 712a indicating a width length of the divisional object 400 and of height information 712b indicating a height of the divisional object 400, as shown in FIG. 9.

Detail of the intermediate code 800 is described below. The intermediate code 800 is information regarding the drawing object to be drawn on a work region in the memory unit 11 as a printing image. The intermediate code 800 has a structure including color setting information 801, rectangle data 802, trapezoid data 803, etc.

The color setting information 801 is information indicating a setting of color (mainly, its density) of the drawing object. The color setting information 801 is information that the color setting information designated by the drawing command is converted as the intermediate code 800. The color setting information 801 respectively corresponds one by one to each layer (the region 1011 to the region 1071) of the gradation pattern 1000 (see FIG. 10).

With the color setting information 801, information indicating the position and size of the drawing object (for example, such as the rectangle data 802, and the trapezoid data 803) is provided immediately below the information 801 in a case that the drawing object corresponding to the color designated by the color setting information 801 exists.

For example, in the example shown in FIG. 9, five of the color setting information 801, namely color setting information 801a, 801b, 801c, 801d, 801e, in a sequence from a thinner color to a denser color, are provided. The color setting information 801a, 801b, 801c, 801d, 801e is corresponding respectively to a layer among the respective layers (regions 1011 to 1071) of the gradation pattern 1000 (see FIG. 10)

The color setting information 801c, 801d, among them, is provided with the rectangle data 802c, 802d of the rectangle drawing objects 100 to be drawn in corresponding to and being arranged immediately below the information 801c, 801d. For the color setting information 801e, the trapezoid data 803 of the trapezoid drawing object, not shown, to be drawn correspondingly is arranged immediately below the information 801e.

For the color setting information 801a, 801b, though only the color setting information designated by a drawing command is converted to the intermediate code 800, no shape data of the corresponding drawing object is arrange immediately below the information. Such a situation occurs, as described below, where it is judged as "Yes" at S160 shown in FIG. 11B and "Yes" at S165, and consequently, where the rectangle data 710A (see FIG. 9) of the drawing object (the lower divisional object 401, see FIG. 8) corresponding to the color setting information 801 are not converted to any intermediate code 800 upon omission of the processing of S170.

The rectangle data 802 are information indicating the position and size of the drawing object corresponding to the color setting information 801 whose type of shape is a rectangle. The trapezoid data 803 are information indicating the position and size of the drawing object corresponding to the color setting information 801 whose type of shape is a trapezoid.

The image processing apparatus 1, for example, specifies, for each layer, the divisional object 400 whose part or all of the region is exposed outside as shown in FIG. 8 in a case that making printing the printing images including the gradation pattern 100, and treats the divisional object 400 as the drawing region 1110 constituting the respective layers of the gradation pattern 1000.

Consequently, the image processing apparatus 1 is capable of drawing the gradation pattern 1000 with the cross-sectional structure shown in FIG. 10. FIG. 10 is a diagram showing a cross-sectional structure of the gradation pattern 100 drawn by the image processing apparatus 1 according to the first embodiment. Hereinafter, the gradation pattern 1000 shown in FIG. 10 is referred to as "the gradation pattern 1000A" in a case of making distinction from the gradation pattern 1000 shown in FIG. 4.

Operation of Image Processing Apparatus

Figure 11A:
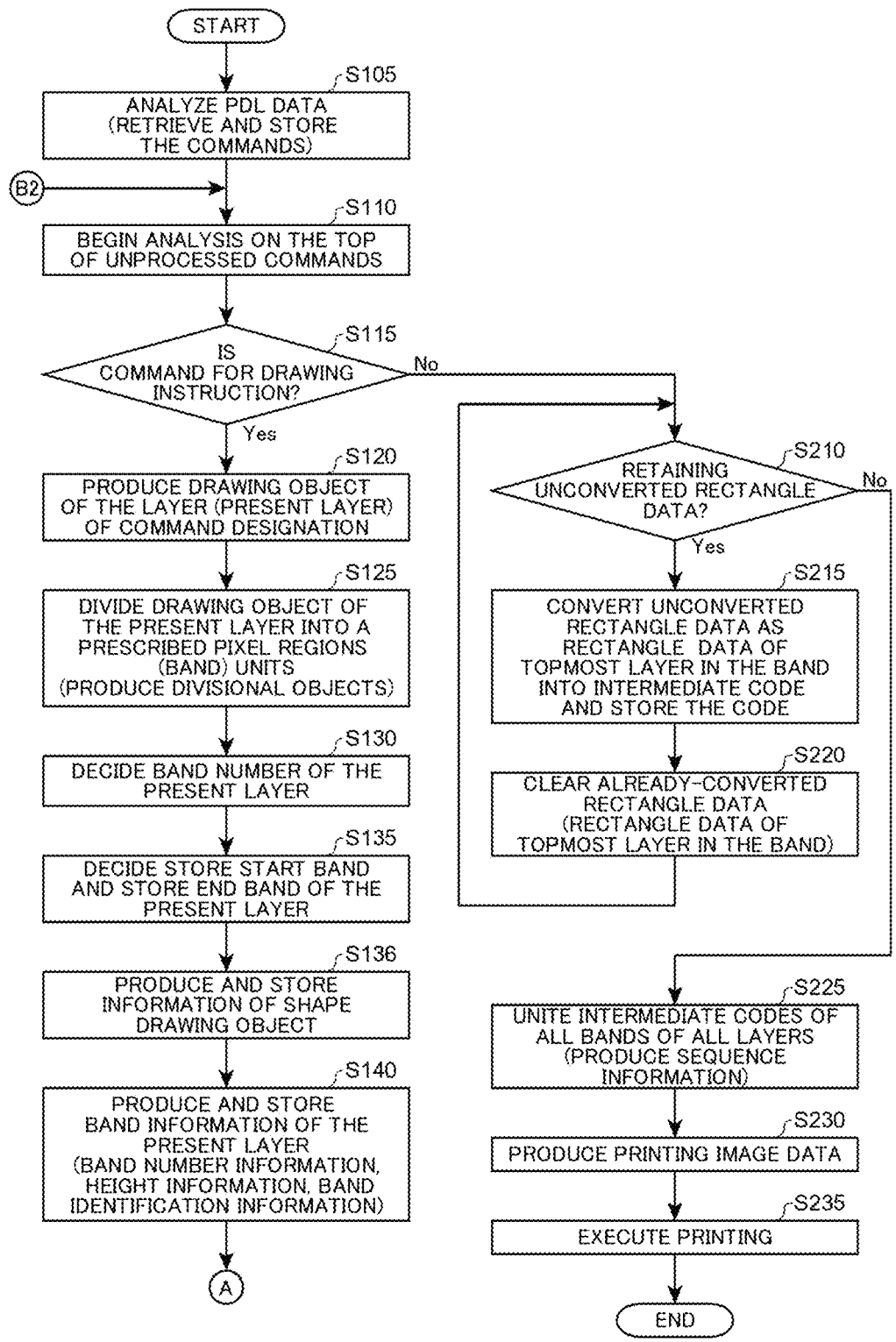
FIG. 11A is a flowchart #1 showing operation of the image processing apparatus according to the first embodiment.
Figure 11B:
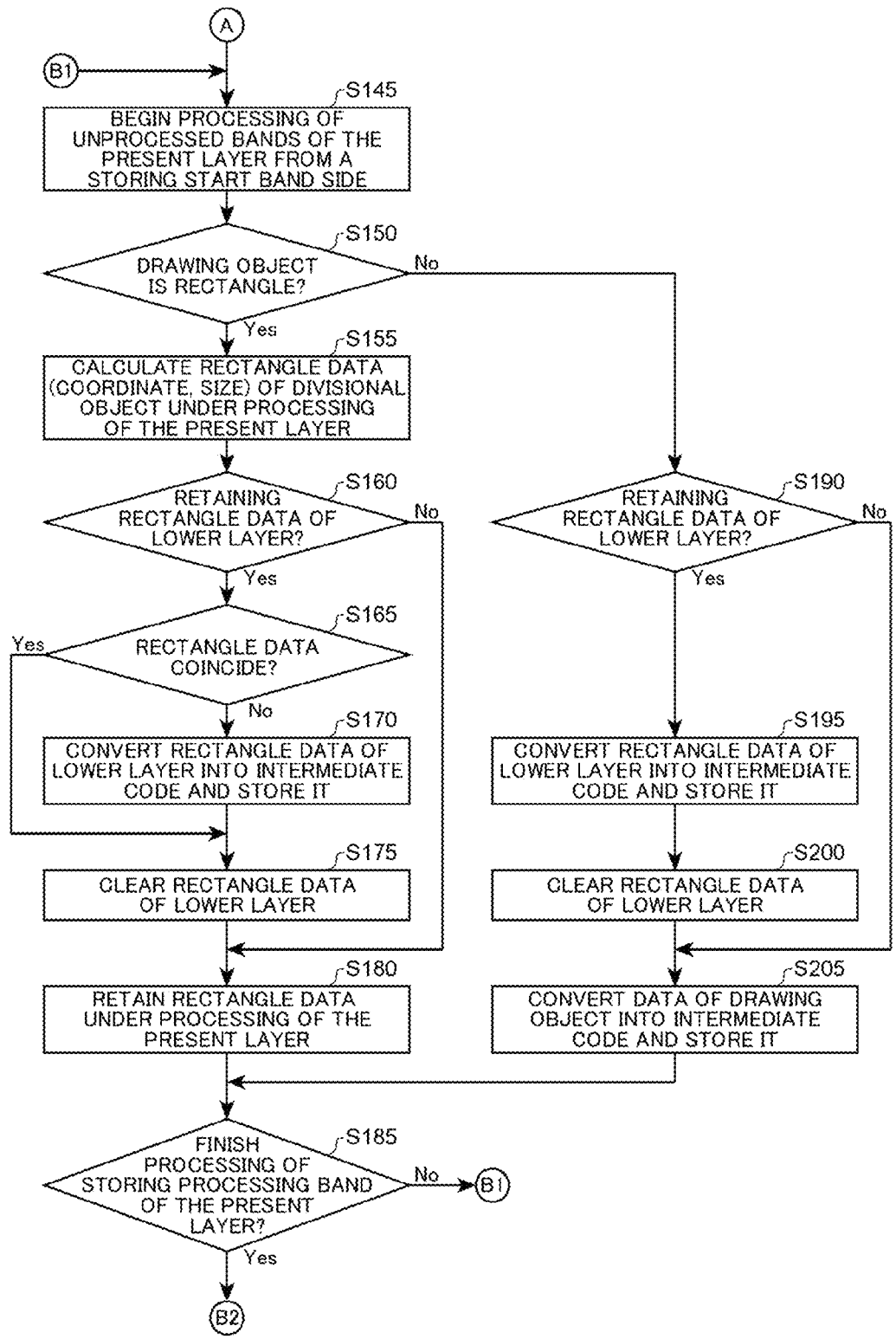
FIG. 11B is a flowchart #2 showing operation of the image processing apparatus according to the first embodiment.

Hereinafter, referring to FIG. 11A and FIG. 11B, operation of the image processing apparatus 1 is described. FIG. 11A and FIG. 11B are flowcharts showing operation of the image processing apparatus 1 according to the first embodiment, respectively. Processing having higher relationship with drawing of the gradation pattern 100A is chiefly described herein, and processing having lower relationship is described for only summary of the processing.

The operation of the image processing apparatus 1 is defined by the control program 90 previously stored in the memory unit 11 in a retrievable manner, and is executed with the control unit 2. The respective data are once stored in a retrievable manner in the memory unit 11, and then are outputted to prescribed structural elements for respective subsequent processings. A detailed description for this point is omitted hereinafter, because those are general processings in the field of information processing technology.

The image processing apparatus 1 begins operation when the data communication unit 10 (see FIG. 10) receives PDL data as printing job data transmitted from a host apparatus, not shown. When the image processing apparatus 1 receives the PDL data, the language analyzing unit 4 begins analysis of the PDL data, and the apparatus 1 retrieves various commands contained in the PDL data from the PDL data and stores temporarily the retrieved commands in the memory unit 11 (S105).

After step S105, the language analyzing unit 4 reads out a top unprocessed command from the memory unit 11 and begins analysis of the unprocessed command (S110). The language analyzing unit 4 at that time judges as to whether designated contents of the analyzed unprocessed command are for drawing instruction (or namely, whether the unprocessed command is the drawing command) (S115).

If the designated contents of the analyzed unprocessed command are not for drawing instruction (e.g., the unprocessed command is for paper delivery instruction command (in a case of "No")) at the judgment of S115, the processing goes to step S210. The processing at S210 is described below.

On the other hand, if the designated contents of the analyzed unprocessed command are for drawing instruction (e.g., the unprocessed command is for drawing command (in a case of "Yes")) at the judgment of S115, the language analyzing unit 4 requests execution of the processing designated by the analyzed unprocessed command to a corresponding functioning unit.

For example, the language analyzing unit 4 requests execution of drawing processing of the shape drawing object designated by the shape drawing command to the shape drawing unit 5 where the designated contents of the analyzed unprocessed command are for drawing of a shape (e.g., the analyzed unprocessed command is for shape drawing command).

The shape drawing unit 5, in response to this, interprets the shape drawing command and produces the shape drawing object (such as triangle, trapezoid, rectangle, etc.) designated by the shape drawing command, on a work region in the memory unit 11 (S120).

For example, if the shape drawing command is a drawing command for designating drawing of the gradation pattern 1000A, the shape drawing unit 5 produces a rectangle drawing object of a layer (the present layer) of color designated by the shape drawing command, on the work region in the memory unit 11.

If the shape drawing command is the drawing command for designating drawing of the gradation pattern 1000A (hereinafter, referred to as "drawing command of the gradation pattern 1000A"), the drawing command of the gradation pattern 1000A is arranged in a direction from a side of the pale color region 1011 to a side of the dense color region 1071 as shown in FIG. 3. Accordingly, the sequence of the drawing command of the gradation pattern 1000A begins from the bottommost layer. The image processing apparatus 1 therefore begins processing of production of the intermediate code 800 described below from the bottommost layer to the topmost layer.

The present layer has a particular color. Therefore, the shape drawing unit 5 retrieves the color setting information (information indicating a color setting) of the present layer designated by the shape drawing command by interpreting the shape drawing command. The color setting information of the present layer retrieved at that time is converted to the intermediate code 800 at some timing, and is retained, or temporarily stored as the color setting information 801 (see FIG. 9) in the memory unit 11.

For example, when the processing of S120 or S140 is done, the shape drawing unit 5 outputs the color setting information of the present layer retrieved at that time to the intermediate code producing unit 8. The intermediate code producing unit 8, in response to this, converts the color setting information of the present layer to the intermediate code 800, and retains the color setting information 801 in the memory unit 11.

If the color setting information of the present layer is retained as the color setting information 801 in the memory unit 11, and at a subsequent processing, where, e.g., shape data 710 (see FIG. 9) corresponding to the color setting information 801 of the present layer are retained in the memory unit 11 and where the shape data 710 are rectangle data 710A, the intermediate code producing unit 8 at step S170 converts the rectangle data 710A to the intermediate code 800 and retains as the rectangle data 802 (see FIG. 9) in the memory unit 11 in a manner corresponding to the color setting information 801 of the present layer.

Where, e.g., shape data 710 (see FIG. 9) corresponding to the color setting information 801 of the present layer are retained in the memory unit 11 and where the shape data 710 are data of a drawing object other than a rectangle (e.g., trapezoid), the intermediate code producing unit 8 at step S205 converts the shape data to the intermediate code 800 and retains as the trapezoid data 803 (see FIG. 9) in the memory unit 11 in a manner corresponding to the color setting information 801 of the present layer.

After the step S120, the shape drawing unit 5 divides the shape drawing object of the present layer produced on the work region in the memory unit 11 into prescribed pixel region (or band 300 (see FIG. 6)) units, thereby producing divisional objects (S125). It is to be noted that the height of the prescribed pixel region, or the band 300, is defined by the control program 90 (see FIG. 1).

If the shape drawing object designated by the shape drawing command is a rectangle drawing object 100 (see FIG. 5(*b*)), the shape drawing unit 5 at that time divides the rectangle drawing object 100 of the present layer into the band units, thereby producing, e.g., the divisional object 400*a* to 400*b* (see FIG. 6) corresponding to the bands 300*a* to 300*g* (see FIG. 6), respectively, on the work region in the memory unit 11.

After the step S120, the shape drawing unit 5 decides the number of the bands 300 corresponding to one page of the present layer (S130), and decides a store start band and store end band of the present layer (S135).

The term of "the store start band" means the band 300 starting being stored in the memory unit 11 of the band identification information 603 (see FIG. 9). In the example shown in FIG. 6 and FIG. 8, the topmost band 300*a*, among the seven bands 300 of the bands 300*a* to 300*g*, becomes "the store start band." "The store start band" decided at that time is processed at S145.

The term of "the store end band" means the band 300 ending being stored in the memory unit 11 of the band identification information 603 (see FIG. 9). In the example shown in FIG. 6 and FIG. 8, the bottommost band 300*g*, among the seven bands 300 of the bands 300*a* to 300*g*, becomes "the store end band." "The store end band" decided at that time is processed at S185.

After the step S135, the shape drawing unit 5 produces the shape drawing object information 200 (see FIG. 5(*a*)) indicating the position and size of the shape drawing object of the present layer, storing the information in the memory unit 11 (S136).

More specifically, the shape drawing unit 5 firstly specifies the type of the shape drawing object to be drawn based on the shape drawing object. The shape drawing unit 5 calculates the origin coordinate information 211 (see FIG. 5(*a*)) of the shape drawing object (e.g., rectangle drawing object 100) of the present layer with reference to the paper origin O99 based on the shape drawing command. The shape drawing unit 5 specifies the size information 212 (see FIG. 5(*a*)) of the shape drawing object of the present layer based on the shape drawing command. The shape drawing unit 5 makes the specified type of the shape enter the type information 201 and produces the shape drawing object information 200 of the present layer based on the type information 201, the origin coordinate information 211, and the size information 212.

The shape drawing unit 5, when producing the shape drawing object information 200 of the present layer, produces the band information 600 (see FIG. 9) and stores it in the memory unit 11 (S140). The band information 600 has a structure including the band number information 601, the band height information 602, and the band identification information 603, as described above.

The shape drawing unit 5 produces the band number information 601 as information indicating the number of the bands 300 decided at step S130. The shape drawing unit 5 produces the band height information 602 as information indicating the height of the bands 300 defined by the control program 90. The shape drawing unit 5 produces the band identification information 603 in a following manner.

The band identification information 603 (see FIG. 9) is structured of the stored address information 700 including the intermediate code stored place information 701 and the retaining information 702.

The intermediate code stored place information 701 is information indicating address to which the intermediate code 800 in the memory unit 5 is stored as described above. The shape drawing unit 5 produces the intermediate code stored place information 701 having its value in an empty state during the processing at step S140. The intermediate code stored place information 701 is renewed to be an address indicating the stored place of the intermediate code 800 by means of the intermediate code producing unit 8 from storing operation of the intermediate code 800 in the memory unit 11 at the time of the processing at the steps of S170, S195, S205 or S215.

The retaining information 702 is information referred at a time producing the intermediate code 800, retained (or temporarily stored) in the memory unit 11, as described above. The retaining information 702 has a structure including the retaining existence information 703 and the shape data 710.

The retaining existence information 703 is information indicating as to whether any shape data 710 to be converted into the intermediate code 800 are retained (or temporarily stored) in the memory unit 11, as described above. The shape drawing unit 5 produces the retaining information 702 taking its value of a state of "not retaining" at a time of processing of S140. When the rectangle data 500 under processing of the present layer calculated at S155 are retained as the rectangle data 710A (see FIG. 9) in the memory unit 11, the retaining information 702 is renewed to take its value of "retaining" by the intermediate code producing unit 8 during the processing at S180.

The shape data 710 are information indicating the position and size of the shape drawing object to be drawn, as described above. The shape drawing unit 5 produces the shape data 710 having its value in an empty state during the processing at step S140. The retaining information 702 is renewed to have a value of the rectangle data 500 (see FIG. 7) under processing of the present layer calculated at S155 as the rectangle data 710A by the intermediate code producing unit 5 during the processing at S180. The shape drawing unit 5 produces the band identification information 603 as described above.

The shape drawing unit 5 produces the shape drawing object information 200 (see FIG. 5(a)) of the present layer and the band information 600 (see FIG. 9) of the present layer, thereby outputting those to the intermediate code producing unit 8. The shape drawing unit 5 at that time may output the color setting information to the intermediate code producing unit 8. Then, the processing goes to step S145 shown in FIG. 11B via "A."

The intermediate code producing unit 8, upon entry of the shape drawing object information 200 of the present layer and the band information 600 of the present layer, begins processing of unprocessed band of the present layer for each band 300 from the side of the store start band decided at step S135 (in the example shown in FIG. 6, from the band 300a) (S145, (see FIG. 11B).

The term of "unprocessed band" means a band including the divisional objects 400 according to the shape data 710 (see FIG. 9) not subject to converting processing to the intermediate code 800 of the present layer.

The term of "processing of unprocessed band of the present layer" means converting processing of the shape data 710 (see FIG. 9) of the lower divisional object 401 to the intermediate code 800 where the divisional object 400 of the present layer is set as the upper divisional object 402 (see FIG. 8) whereas the divisional object 400 provided on a lower side of the upper divisional object 402 is set as the lower divisional object 401 (see FIG. 8) (hereinafter, referred to as "producing processing of the intermediate code 800" in some case).

The intermediate code producing unit 8, when beginning the processing of unprocessed band of the present layer at step S145, sets the unprocessed band located at the topmost position on a side of the store start band (in the example shown in FIG. 6, band 300a) of the present layer as the "target band," and judges as to whether the type of the shape of the drawing object contained in the target band is rectangle (S150).

The judgment at S150 is done by referring the type information 201 (see FIG. 5(a)) of the shape drawing object information 200 of the present layer inputted from the shape drawing unit 5.

A situation that it is judged that the type of the shape of the drawing object contained in the target band is rectangle at the judgment at S150 (a case of "Yes") means that the drawing object contained in the target band is the divisional object 400 (see FIG. 6) in which the rectangle drawing object 100 is divided.

When it is judged that the type of the shape of the drawing object contained in the target band is rectangle at the judgment at S150 (a case of "Yes"), the intermediate code producing unit 8 calculates the rectangle data 500 (see FIG. 7) of the divisional object 400 under processing of the present layer, where the drawing object contained in the target band (or the divisional object 400) is set as "the divisional object 400 under processing of the present layer" (S155).

More specifically, the intermediate code producing unit 8 calculates the X-coordinate information 211a of the shape drawing object information 200 as the band X-coordinate information 511a indicating the X-coordinate of the origin O400 of the divisional object 400 under processing of the present layer, based on the X-coordinate information 211a (see FIG. 5(a)) of the shape drawing object information 200 entered from the shape drawing unit 5.

The intermediate code producing unit 8 calculates the band Y-coordinate information 511b (see FIG. 7) indicating the Y-coordinate of the origin O400 of the divisional object 400 under processing of the present layer, based on the band height information 602 (see FIG. 9) of the band information 600 and the Y-coordinate information 211b (see FIG. 5(a)) of the shape drawing object information 200 which are entered from the shape drawing unit 5. For example, the intermediate code producing unit 8 calculates a value of a total of the band height information 602 from the store start band of the present layer to a band 300 one previous to the target band with addition of the Y-coordinate information 211b as the band Y-coordinate information 511b of the divisional object 400 under processing of the present layer.

The intermediate code producing unit 8 calculates the width information 212a of the shape drawing object information 200 as the width information 512a indicating the width length of the divisional object 400 under processing of the present layer, based on the width information 212a (see FIG. 5(a)) of the shape drawing object information 200 entered from the shape drawing unit 5.

The intermediate code producing unit 8 calculates the band height information 602 as the height information 512b (see FIG. 7) of the divisional object 400 under processing of the present layer, based on the band height information 602 (see FIG. 9) of the band information 600 entered from the shape drawing unit 5.

The band X-coordinate information 511a and the band Y-coordinate information 511b form the intra-band origin coordinate information 511 (see FIG. 5(a)) of the divisional object 400 under processing of the present layer. The width information 512a and the height information 512b form the size information 512 of the divisional object 400 under processing of the present layer. The intra-band origin coordinate information 511 and the size information 512 form the rectangle data 500 of the divisional object 400 under processing of the present layer. Hereinafter, the rectangle data 500 of the divisional object 400 under processing of the present layer is referred to as "the rectangle data 500 under processing of the present layer."

After step S155, the intermediate code producing unit 8 sets the divisional object 400 under processing of the present layer as the upper divisional object 402 (see FIG. 8), sets the divisional object of a lower layer provided on a lower side of the upper divisional object 402 as the lower divisional object 401 (see FIG. 8), and judges as to whether the rectangle data 500 of the lower divisional object 401 is retained as the rectangle data 710A (see FIG. 9) in the memory unit 11 (S160).

The judgment at step S160 is done at the intermediate code producing unit 8 by judging as to whether the value of the retaining existence information 703 is in the state of "retaining" in referring the retaining existence information 703 in the band identification information 603 corresponding to the target band, stored in the memory unit 5.

If the value of the retaining existence information 703 is in the state of "retaining," the intermediate code producing unit 8 judges that the rectangle data 500 of the lower divisional object 401 is retained as the rectangle data 710A (see FIG. 9)

in the memory unit 11 (or "Yes"). To the contrary, if the value of the retaining existence information 703 is of "not retaining," the intermediate code producing unit 8 judges that the rectangle data 500 of the lower divisional object 401 are not retained as the rectangle data 710A (see FIG. 9) in the memory unit 11 (or "No"). It is to be noted that, if the producing processing of the intermediate code producing unit 8 is the first time (or the present layer is the bottommost layer in the target band), the judgment at S160 is made as "No."

If the rectangle data 500 of the lower divisional object 401 are not retained as the rectangle data 710A in the memory unit 11 (or "No") at the judgment of S160, the processing goes to the step S180.

On the other hand, if the rectangle data 500 of the lower divisional object 401 are retained as the rectangle data 710A (see FIG. 9) in the memory unit 11 (or "Yes") at the judgment of S160, the intermediate code producing unit 8 judges as to whether the rectangle data 500 under processing of the present layer calculated at S155 coincide to the rectangle data 710A of lower divisional object 401 retained in the memory unit 11 (hereinafter, referred to as "rectangle data 710A of the lower layer") (S165).

If it is judged at the judgment of S165 that the rectangle data 500 under processing of the present layer calculated at S155 coincide to the rectangle data 710A of the lower layer retained in the memory unit 11 (in a case of "Yes"), this means that the entire region of the lower divisional object 401 according to the rectangle data 710A retained in the memory unit 11 during the processing from S145 to S185 in the previous time is completely overlapping the region of the upper divisional object 402 according to the rectangle data 500 under processing of the present layer and are hiding completely under the region of the upper divisional object 402.

If it is judged at the judgment of S165 that the rectangle data 500 under processing of the present layer calculated at S155 do not coincide to the rectangle data 710A of the lower layer retained in the memory unit 11 (in a case of "No"), this means that a part of the region of the lower divisional object 401 according to the rectangle data 710A retained in the memory unit 11 during the processing from S145 to S185 in the previous time is protruding out of the region of the upper divisional object 402 according to the rectangle data 500 under processing of the present layer and are exposing itself outside.

The judgment at S165 is performed at the intermediate code producing unit 8 (#1) as to whether the positions of the upper divisional object 402 and the lower divisional object 401 coincide to each other (or namely, the intra-band origin coordinate information 511 of the rectangle data 500 of the upper divisional object 402 coincides the intra-bond origin coordinate information 711 of the rectangle data 710A of the lower divisional object 401), and (#2) as to whether the sizes of the upper divisional object 402 and the lower divisional object 401 coincide to each other (or namely, the size information 512 of the rectangle data 500 of the upper divisional object 402 coincides the size information 712 of the rectangle data 710A of the lower divisional object 401).

For example, the intermediate code producing unit 8 compares the band X-coordinate information 511a of the rectangle data 500 under processing of the present layer calculated at S155 with the band X-coordinate information 711a of the rectangle data 710A of the lower layer retained in the memory unit 11.

Subsequently, the intermediate code producing unit 8 compares the band Y-coordinate information 511b of the rectangle data 500 under processing of the present layer calculated at S155 with the band Y-coordinate information 711b of the rectangle data 710A of the lower layer retained in the memory unit 11. It is to be noted that the Y-coordinate information 511b and the Y-coordinate information 711b in general commonly take their value of "0."

The intermediate code producing unit 8 then compares the width information 512a of the rectangle data 500 under processing of the present layer calculated at S155 with the width information 712a of the rectangle data 710A of the lower layer retained in the memory unit 11.

The intermediate code producing unit 8 further compares the height information 512b of the rectangle data 500 under processing of the present layer calculated at S155 with the height information 712b of the rectangle data 710A of the lower layer retained in the memory unit 11.

If it is judged at the judgment of S165 that the rectangle data 500 under processing of the present layer calculated at S155 do not coincide to the rectangle data 710A of the lower layer retained in the memory unit 11 (in a case of "No"), the intermediate code producing unit 8 converts the rectangle data 710A of the lower layer retained in the memory unit 11 into the intermediate code 800 and stores as the rectangle data 802 (see FIG. 9) in the memory unit 11 in corresponding to the color setting information 801 of the lower divisional object 401 (S170).

The intermediate code producing unit 8 at that time changes the value of the retaining existence information 703 to the state of "not retaining" because the rectangle data 710A retained in the memory unit 11 are already converted to the intermediate code 800.

After the step S170, the intermediate code producing unit 8 clears the rectangle data 710A of the lower layer retained in the memory unit 11 (S175). The intermediate code producing unit 8 retains the rectangle data 500 under processing of the present layer calculated at S155 as the rectangle data 710A in the memory unit 11 (S180).

At the processing of S180, the intermediate code producing unit 8 stores the intra-band origin coordinate information 511 of the rectangle data 500 under processing of the present layer calculated at S155 (or namely, the X-coordinate information 511a, and the Y-coordinate information 511b) as the intra-band origin coordinate information 711 of the rectangle data 710A (or namely, the X-coordinate information 711a, and the Y-coordinate information 711b) in the memory unit 11. The intermediate code producing unit 8 stores the size information 512 (or namely, the width information 512a and the height information 512b) of the rectangle data 500 under processing of the present layer calculated at S155 as the size information 712 of the rectangle data 710A (or namely, the width information 712a and the height information 712b) in the memory unit 11. The intermediate code producing unit 8 further changes the value of the retaining existence information 703 to the state of "retaining."

If it is judged at the judgment of S165 that the rectangle data 500 under processing of the present layer calculated at S155 coincide to the rectangle data 710A of the lower layer retained in the memory unit 11 (in a case of "Yes"), the processing goes to the step S175.

In this case, the image processing apparatus 1 does not execute the processing of S170. The image processing apparatus 1 therefore does not convert the rectangle data 710A of the lower layer retained in the memory unit 11 to the intermediate code 800, and clear them at S175.

In such a case, because no intermediate code 800 corresponding to the rectangle data 710A of the lower layer is produced, the lower divisional object 401 completely hiding under the upper divisional object 402 is treated as the non-drawing region 1111, so that the drawing processing for the region is omitted when the printing image data are produced at S230.

If it is judged at the judgment of S150 that the type of the shape of the drawing object contained in the target band is not rectangle (in a case of "No"), the intermediate code producing unit 8 judges as to whether the rectangle data 500 of the lower divisional object 401 is retained as the rectangle data 710A (see FIG. 9) in the memory unit 11 in substantially the same way as the processing of S160 (S190).

If the rectangle data 500 of the lower divisional object 401 are not retained as the rectangle data 710A in the memory unit 11 at the judgment of S190 (in a case of "No"), the processing goes to S205.

To the contrary, if the rectangle data 500 of the lower divisional object 401 are retained as the rectangle data 710A in the memory unit 11 at the judgment of S190 (in a case of "Yes"), the intermediate code producing unit 8 converts the rectangle data 710A of the lower layer retained in the memory unit 11 into the intermediate code 800 and stores as the rectangle data 802 (see FIG. 9) in the memory unit 11 in corresponding to the color setting information 801 of the lower divisional object 401, in substantially the same way as the processing of S170 (S195).

The intermediate code producing unit 8 at that time changes the value of the retaining existence information 703 to the state of "not retaining" because the rectangle data 710A retained in the memory unit 11 are already converted to the intermediate code 800.

After the step S195, the intermediate code producing unit 8 clears the rectangle data 710A of the lower layer retained in the memory unit 11 (S200). The intermediate code producing unit 8 produces the intermediate code 800 corresponding to the drawing object according to the shape drawing object information 200 under processing of the present layer, and retains them in the memory unit 11 (S205).

After the steps of S180 and S205, the intermediate code producing unit 8 judges as to whether the retaining processing (hereinafter referred to as "processing of the store end band of the present layer") of the rectangle data 500 of the divisional object 400 (the upper divisional object 402) corresponding to the store end band of the present layer is ended (S185). The judgment at S185 is made by judging as to whether the target band under processing of the present layer is the store end band decided at S135.

If it is judged that the processing of the store end band of the present layer is not ended at the judgment at S185 (in the case of "No"), the processing returns to the step S145 via "B1." The image processing apparatus 1 at that time repeats the processing of S145 to S185 until the end of the processing of the store end band of the present layer.

From this operation, the image processing apparatus 1 produces the intermediate code 800 corresponding to the rectangle data 710A of the lower divisional object 401 protruding out of the region of the upper divisional object 402 with respect to the rectangle drawing object 100 contained in a layer one below the present layer.

In a meantime, if it is judged that the processing of the store end band of the present layer is ended at the judgment at S185 (in the case of "Yes"), the processing returns to S110 via "B2." In this situation, the image processing apparatus 1 begins analysis of the top unprocessed command at s110. The unprocessed command at the second place during the previous analysis for the unprocessed command at S110 becomes the top unprocessed command at that time. The image processing apparatus 1 repeats producing processing of the intermediate code 800 in shifting the layer as the reference (hereinafter, referred to as "reference layer") for judgment of the producing processing of the intermediate code 800 one by one to an upper layer, until that it is judged that the designated contents of the analyzed unprocessed command are not for drawing designation (No) at the judgment of S115.

The image processing apparatus 1 with this operation produces the intermediate code 800 corresponding to the rectangle data 710A of the lower divisional object 401 protruding out of the region of the upper divisional object 402 from the bottom layer to the layer one below the topmost layer designated by the drawing command of the gradation pattern 1000A (see FIG. 10). The image processing apparatus 1 also produces the intermediate code 800 corresponding to the drawing object if any drawing object exists other than rectangle.

If the designated contents of the analyzed unprocessed command are not for drawing designation (e.g., the unprocessed command is for paper delivery designation command (in a case of "No")) at the judgment of S115, the language analyzing unit 4 outputs a production complete notice of the intermediate code 800 for one page to the intermediate code producing unit 8. This production complete notice indicates the production completion of the intermediate code 800 from the bottom layer to the layer one below the topmost layer designated by the drawing command of the gradation pattern 1000A where the drawing object is the gradation pattern 1000A.

Upon the entry of the production complete notice from the language analyzing unit 4, the intermediate code producing unit 8 judges, in response to this, as to whether the unconverted rectangle data 710A are retained in the memory unit 11 (S210).

The judgment at S210 is made at the intermediate code producing unit 8 by judging as to whether the value of the retaining existence information 703 is in the state of "retaining" in referring to the retaining existence information 703 in each of the band identification information 603 stored in the memory unit 11.

If the value of the retaining existence information 703 in any of the band identification information 603 is in the state of "retaining," the intermediate code producing unit 8 judges that the unconverted rectangle data 710A are retained in the memory unit 11 ("Yes"). To the contrary, the intermediate code producing unit 8 judges that the unconverted rectangle data 710A are not retained in the memory unit 11 ("No"), if the value of the retaining existence information 703 in any of the band identification information 603 is in the state of "not retaining."

If it is judged that the unconverted rectangle data 710A are retained in the memory unit 11 (in a case of "Yes") at the judgment of S210, the intermediate code producing unit 8 converts the unconverted rectangle data 710A retained in the memory unit 11 to the intermediate code 800 as the rectangle data 802 (see FIG. 9) of the topmost layer in the band 300 (hereinafter, referred to as "topmost layer in the band") corresponding to the band identification information 603. The intermediate code producing unit 8 stores the rectangle data 802 in the memory unit 11 in corresponding to the color setting information 801 of the topmost layer in the band (S215).

The intermediate code producing unit 8 at that time changes the value of the retaining existence information 703 to the state of "not retaining" because the rectangle data 710A retained in the memory unit 11 are already converted to the intermediate code 800.

After the step S215, the intermediate code producing unit 8 clears the already converted rectangle data 710A retained in the memory unit 11 (or namely, the rectangle data 710A of the topmost layer in the band) (S220).

After the step of S220, the processing returns to the step S210. As a result, the image processing apparatus 1 repeats processing of S210 to S220, until that it is judged that the unconverted rectangle data 710A are not retained in the memory unit 11 (No) at the judgment of S210, or that the value of the retaining existence information 703 in all of the band identification information 603 is in the state of "not retaining"

If the unconverted rectangle data 710A are not retained in the memory unit 11 (No) at the judgment of S210, the intermediate code producing unit 8 combines the intermediate codes 800 of the all bands 300 of the entire layers for one page stored in the memory unit 11, produces sequence information of the intermediate codes 800 for one page (S225), and outputs the produced sequence information of the intermediate codes 800 for one page to the printing image data producing unit 9.

The printing image data producing unit 9 produces printing image data (S230) based on the sequence information when receiving the sequence information of the intermediate codes 800 for one page from the intermediate code producing unit 8, and outputs the data to the image printing unit 12.

The image printing unit 12 executes printing processing based on the printing image data when receiving the printing image data from the printing image data producing unit 9 (S235). With this operation, the image processing apparatus 1 finishes the series of operations. If the printing job data are for plural pages, the image processing apparatus 1 repeats the processing shown in FIG. 11A and FIG. 11B for the number of the pages.

Features of Operation of the Image Processing Apparatus

The operation of the image processing apparatus 1 has the following features. The image processing apparatus 1 begins analysis of the unprocessed command at S110 and begins production processing of the intermediate code 800 for each of the bands 300 if it is judged that the designated contents of the analyzed unprocessed command are for drawing designation (i.e., the unprocessed command is for drawing command (in a case of "Yes")) at the judgment of S115 (i.e., the converting processing to the intermediate code 800 from the rectangle data 710A retained in the memory unit 11).

The sequence of the drawing commands of the gradation pattern 1000A starts from the bottommost later. The image processing apparatus 1 therefore begins producing processing of the intermediate code 800 from the bottommost layer to the side of higher layers.

The image processing apparatus 1 performs converting processing to the intermediate code 800 not only for the rectangle data 500, as a target of the converting processing, of the divisional object 400 (upper divisional object 402) of the present layer designated by the unprocessed command but also for the rectangle data 710A, as a target of the converting processing, of the lower divisional object 401 at S170 in a case that the rectangle data 710A of the lower divisional object 401 not coinciding to the rectangle data 500 of the divisional object 400 of the present layer (or namely, the rectangle data 710A of the lower divisional object 401 protruding out of the region of the divisional object 400 of the present layer) are retained in the memory unit 11 (in a case of "No" at the judgment of S165).

The image processing apparatus 1 performs converting processing of the rectangle data 710A of the lower divisional object 401 to the intermediate code 800 at S170, clears the rectangle data 710A of the lower divisional object 401 retained in the memory unit 11 (S175), and retains the rectangle data 500 of the divisional object 400 (upper divisional object 402) of the present layer in the memory unit 11.

The image processing apparatus makes the processing go to S175 in a case that the rectangle data 710A of the lower divisional object 401 coinciding to the rectangle data 500 of the divisional object 400 of the present layer (or namely, the rectangle data 710A of the lower divisional object 401 completely hiding under the region of the divisional object 400 of the present layer) are retained in the memory unit 11 (in a case of "Yes" at the judgment of S165).

In this case, the image processing apparatus 1 does not produce any intermediate code 800 corresponding to the rectangle data 710A of the lower layer completely hiding under the region of the divisional object 400 of the present layer. The drawing processing of the lower divisional object 401 is therefore omitted when the printing image data are produced at S230.

The image processing apparatus 1 repeats processing of S145 to S185 until that the processing of the store end band of the present layer is ended (i.e., until that it is judged as "Yes" at the judgment at S185). The image processing apparatus 1 makes the processing return to S110 when the processing of the store end band of the present layer is ended (i.e., when it is judged as "Yes" at the judgment at S185).

Upon the processing returning to S110, the image processing apparatus begins the subsequent processing of the unprocessed command. The image processing apparatus 1 at that time switches the present layer to a layer designated by the unprocessed command in a case that the unprocessed command is the drawing command of the gradation pattern 1000A (or in a case of "Yes" at the judgment of S115). The layer designated by the unprocessed command becomes a layer upper than that the layer at the time of production processing of the intermediate code 800 of the previous time.

The image processing apparatus 1 uses the present layer after switching as the reference layer (i.e., a layer for reference of judgment of the producing processing of the intermediate code 800), and does producing processing of the intermediate code 800 in substantially the same way as the producing processing of the intermediate code 800 in the previous time.

Consequently, the image processing apparatus 1, while shifting the reference layer to an upper layer one by one, repeats producing processing of the intermediate code 800 from the bottommost layer to a layer one below the topmost layer, which are designated by the drawing command of the gradation pattern 1000A (see FIG. 10). This "producing processing of the intermediate code 800" is done repetitively from the bottommost layer to the topmost layer, which are designated by the drawing command of the gradation pattern 1000A, by shifting the present layer to the upper layers one by one when viewing the present layer as the reference layer.

The image processing apparatus 1 does not switch the layer where it is judged that the unprocessed command is the paper delivery designation command at the judgment of S115 (or in a case of "No"), and executes printing at S235. In such a case, the rectangle data 710A of the drawing object 400 of the topmost layer in each of the bands 300 are not converted to the intermediate code 800 but are retained in the memory unit 11. The image processing apparatus 1 therefore converts the rectangle data 710A of the drawing object of the topmost layer in each of the bands 300 to the intermediate code 800 at S210 to S220.

The image processing apparatus 1 thus formed omits production of the intermediate code 800 of the lower divisional object 401 whose position and size are coinciding to those of the upper divisional object 402 for each band 300, and performs production of the intermediate code 800 of the lower divisional object 401 other than the above case, from the bottommost layer to the topmost layer.

The image processing apparatus 1 therefore omits production of the intermediate code 800 of the lower divisional object 401 completely hiding under the upper divisional object 402. The image processing apparatus 1 accordingly can reduce the production time for printing image data including the gradation pattern 1000.

As described above, according to the image processing apparatus 1 of the first embodiment, the production of the intermediate code 800 of the rectangle drawing object 100 can be omitted in a case that the prescribed conditions are satisfied, so that the production time for printing image data including the gradation pattern 1000 can be reduced.

Second Embodiment

Figure 14:
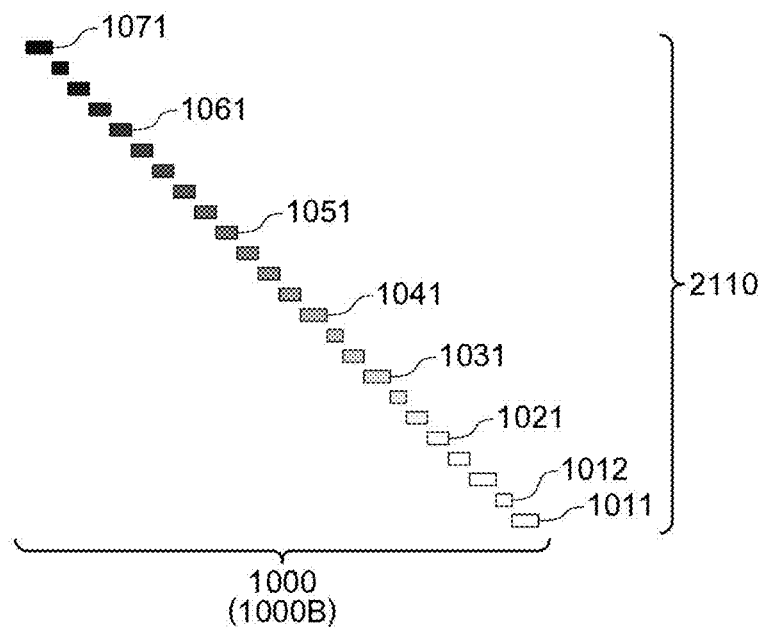
FIG. 14 is a diagram showing a cross-sectional structure of the gradation pattern drawn by the image processing apparatus according to the second embodiment.

An image processing apparatus 1B, not shown, according to a second embodiment is different in a view for drawing the gradation pattern 100 in use of not the rectangle drawing region 1110 shown in FIG. 10 but the rectangle drawing region 2110 shown in FIG. 14 as the rectangle drawing region forming the gradation pattern 1000 (FIG. 2) in comparison with the image processing apparatus 1 according to first embodiment.

Hereinafter, the image processing apparatus 1B according to the second embodiment is described in detail. The image processing apparatus 1B according to the second embodiment has the same structure as the image processing apparatus 1 according to the first embodiment (see FIG. 1). The image processing apparatus 1B according to the second embodiment has an intermediate code producing unit 8 operating differently in comparison with the image processing apparatus 1 according to the first embodiment.

Figure 12:
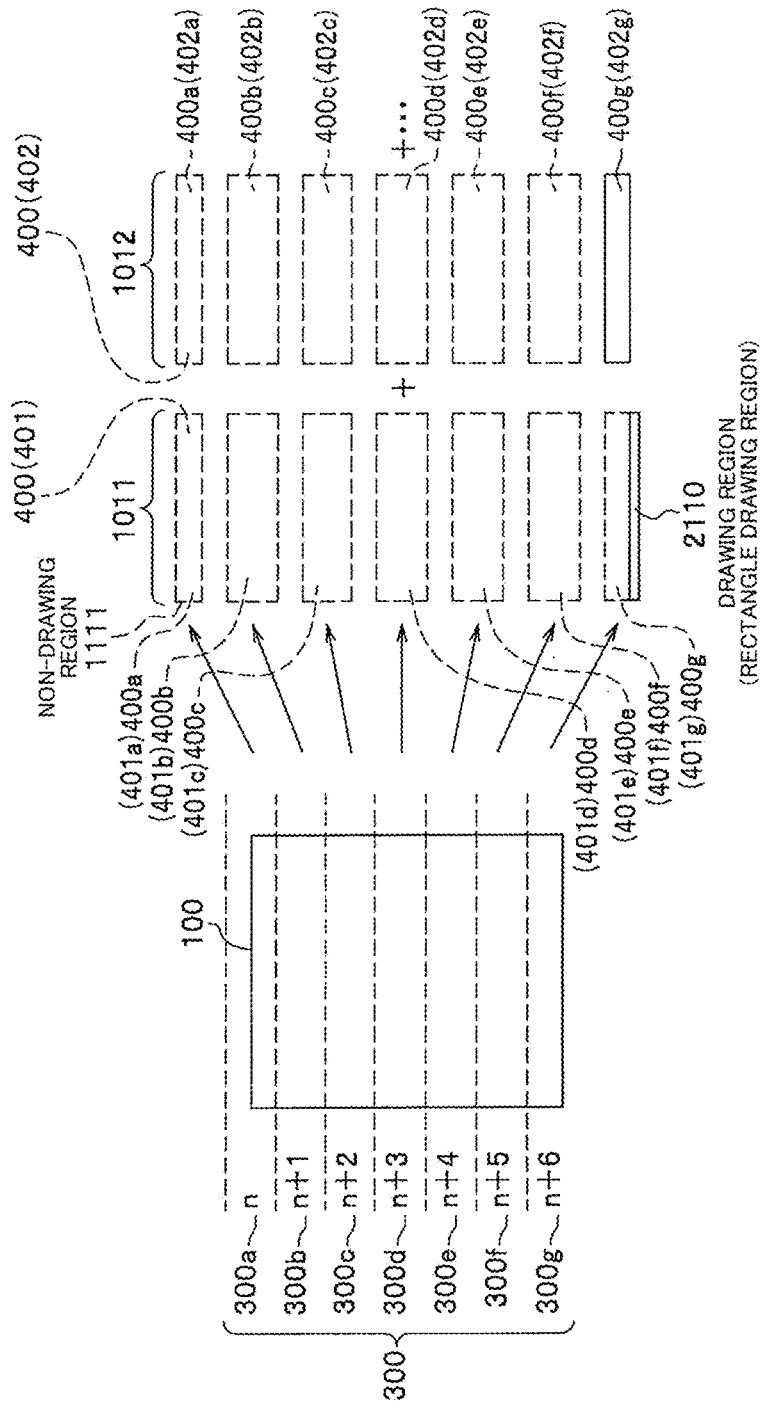
FIG. 12 is a diagram showing operation at a time producing intermediate codes of the image processing apparatus according to a second embodiment.

FIG. 12 is a diagram showing operation at a time producing intermediate codes of the image processing apparatus 1B, not shown, according to the second embodiment. FIG. 12 shows, similarly to FIG. 8, structures of the lower divisional object 401 (i.e., lower divisional objects 401*a* to 401*g* in the drawing) forming a layer of the region 1011 of the gradation pattern 1000 (see FIG. 3, FIG. 4) and of the upper divisional object 402 (i.e., upper divisional objects 402*a* to 402*g* in the drawing) forming a layer of the region 1012, in a comparing manner.

In the second embodiment, the lower divisional objects 401*a* to 401*g* and the upper divisional objects 402*a* to 402*g* are categorized into either of drawing regions 2110 shown with a solid line in FIG. 12 and non-drawing regions 1111 shown with a dot line in FIG. 12, respectively.

The drawing region 2110 is a region protruding out of the region of the divisional object 400 of other layers (or the upper divisional object 402) and exposing itself outside. The drawing region 2110 is a region unable to omit production of the intermediate code 800 because drawing is inevitable in substantially the same way as the drawing region 1110 (see FIG. 8) according to the first embodiment.

The drawing region 2110 is different in the following points from the drawing region 1110 according to the first embodiment. That is, the drawing region 1110 according to the first embodiment is the entire region of the lower divisional object 401 of the band unit including regions protruding out of the region of the upper divisional object 402. To the contrary, the drawing region 2110 is a region of the lower divisional object 401 protruding out of the region of the upper divisional object 402.

In the example shown in FIG. 12, the lower divisional objects 401*a* to 401*f* are hiding completely under the upper divisional objects 402*a* to 402*f*, respectively. All of the regions of the lower divisional objects 401*a* to 401*f* therefore become the non-drawing regions 1111.

In the example shown in FIG. 12 for, the lower divisional object 401*g*, a region hiding under the upper divisional object 402*g* becomes the non-drawing region 1111, whereas a region protruding out of the region of the upper divisional object 402*g* becomes the drawing region 2111.

In the example shown in FIG. 12 for, the lower divisional object 402*g*, in substantially the same way as the lower divisional object 401*g*, a region hiding under the divisional object 400 of an upper layer or upper layers becomes the non-drawing region 1111, whereas a region protruding out of the region of the divisional object 400 of an upper layer or upper layers becomes the drawing region 2111.

The image processing apparatus 1B, for each band 300, produces data indicating the position and size in the band 300 of the drawing region 2110 (hereinafter, referred to as "difference rectangle data 2110A (see FIG. 13(*a*))") as a region of difference between the lower divisional object 401*g* and the upper divisional object 402*g* based on the rectangle data of the lower divisional object 401*g* (the rectangle data 710A retained in the memory unit 11) and the rectangle data of the upper divisional object 402*g* (the rectangle data 500 calculated from the shape drawing object information 200).

FIG. 13 is a diagram showing a structure of the difference rectangle data 2110A used in the second embodiment. FIG. 13(*a*) shows the structure of the difference rectangle data 2110A; FIG. 13(*b*) shows a structure of the drawing region 2110 corresponding to the difference rectangle data 2110A. As shown in FIG. 13(*a*), the difference rectangle data 2110A has a structure including position information 2111 and size information 2112.

The position information 2111 is information indicating the position of the origin of the respective drawing regions 2110 in the band 300. It is described herein in assuming that, as shown in FIG. 13 (*b*), where a left upper corner of the drawing region 2110 is set as the origin of the drawing region (hereinafter, referred to as "drawing region origin O2110" in some cases), the position information 2111 is information indicating the coordinate of the drawing region origin O2110 with reference of the band origin O300.

Hereinafter, the position information 2111 is referred to as "intra-band origin coordinate information 2111." The intra-band origin coordinate information 2111 is made of an X-coordinate information 2111*a* indicating the X-coordinate of the drawing region origin O2110 with reference to the band origin O300, and a Y-coordinate information 2111*b* indicating the Y-coordinate of the drawing region origin O2110 with reference to the band origin O300, where the coordinate of the band origin O300 is set as (0,0) as shown in FIG. 13(*a*). Hereinafter, the X-coordinate information 2111*a* is referred to as "the band X-coordinate information 2111*a*" whereas the Y-coordinate information 2111*b* is referred to as "the band Y-coordinate information 2111*b*"

The size information 2112 is information indicating size of the respective drawing regions 2110. It is described herein in assuming that the size information 2112 is structured of width information 2112*a* indicating a length of the width of the drawing region 2110, and height information 2112*b* indicating the height of the drawing region 2110, as shown in FIG. 13(*a*).

In a case of printing the printing image including, e.g., the gradation pattern 1000 (see FIG. 2), the image processing apparatus 1B specifies the divisional object 400 whose part or all is exposing itself outside for each layer as shown in FIG. 12, specifies regions exposed out of the divisional object 400, and treats the externally exposing regions as the drawing regions 2110 forming the respective layers of the gradation pattern 1000.

Consequently, the image processing apparatus 1B can draw the gradation pattern 1000 having a cross-sectional structure shown in FIG. 14. FIG. 14 is a diagram showing the cross-sectional structure of the gradation pattern 1000 to be drawn by the image processing apparatus 1B according to the second embodiment. Hereinafter, the gradation pattern 1000 shown in FIG. 14 is referred to as "the gradation pattern 1000B" in a case of making distinction from the gradation pattern 1000 shown in FIG. 4 and the gradation pattern 1000A shown in FIG. 10.

Figure 15A:
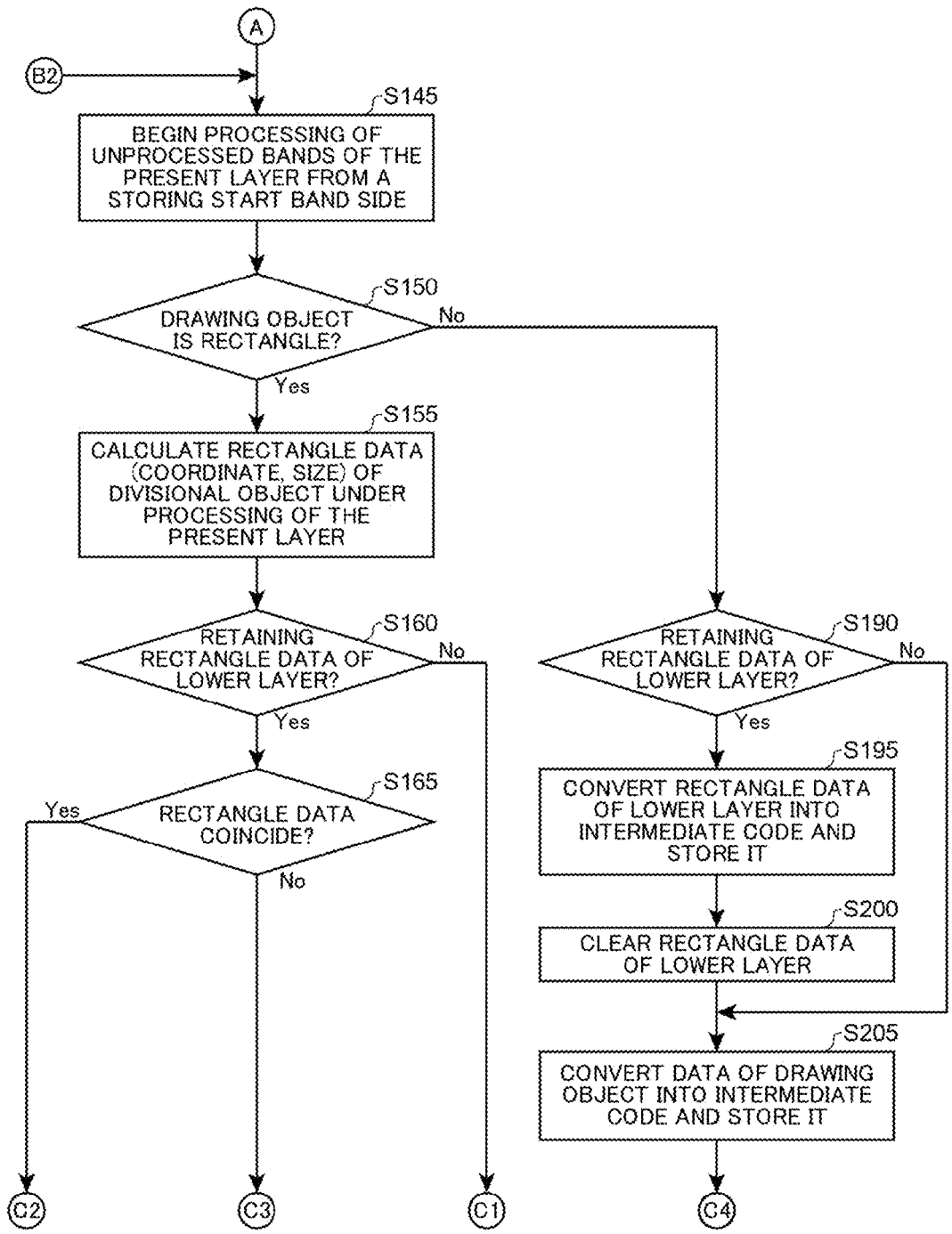
FIG. 15A is a flowchart #1 showing operation of the image processing apparatus according to the second embodiment.

Referring to FIG. 15A and FIG. 15B, hereinafter, operation of the image processing apparatus 1B, not shown, is described. FIG. 15A and FIG. 15B are flowcharts showing operation of the image processing apparatus 1B according to the second embodiment, respectively. FIG. 15A shows operation following to the processing of S140 shown in FIG. 11. FIG. 15B shows operation following to the processing shown in FIG. 15A.

With respect to the operation of the image processing apparatus 1B according to the second embodiment, operation different from that of the image processing apparatus 1 according to the first embodiment is described chiefly, and for substantially the same operation as the image processing apparatus 1 according to the first embodiment (see FIG. 11A, FIG. 11B), any detailed description is omitted while the operation of the image processing apparatus 1 according to the first embodiment is read as the operation of the image processing apparatus 1B according to the second embodiment.

As shown in FIG. 15A and FIG. 15B, the operation of the image processing apparatus 1B according to the second embodiment is different in performing processing of S305 to S320 in a case that it is judged that the rectangle data 500 under processing of the present layer calculated at S155 does not coincide to the rectangle data 710A of the lower layer retained in the memory unit 11 (or in a case of "No") at the judgment of S165, when comparing with the operation of the image processing apparatus 1 according to the first embodiment.

The operation other than those processings in the image processing apparatus 1B according to the second embodiment is the same as that in the image processing apparatus 1 according to the first embodiment. Hereinafter, the processing of S305 to S320 and processing before or after the processing are described chiefly.

As shown in FIG. 15A, with the image processing apparatus 1B, the intermediate code producing unit 8 judges at S160 as to whether the rectangle data 500 of the lower divisional object 401 are retained as the rectangle data 710A in the memory unit 11. If it is a case of "Yes" at the judgment of S160, the processing goes to S165. To the contrary, if it is a case of "No" at the judgment of S160, the processing goes to S180 via node"C1."

If it is judged that the rectangle data 500 of the lower divisional object 401 are retained as the rectangle data 710A in the memory unit 11 (or in a case of "Yes"), the intermediate code producing unit 8 judges at S165 as to whether the rectangle data 500 under processing of the present layer calculated at S155 coincide to the rectangle data 710A of the lower layer retained in the memory unit 11. If it is a case of "Yes" at the judgment of S165, the processing goes to S175 via node "C2." To the contrary, if it is a case of "No" at the judgment of S165, the processing goes to S305 via node"C3."

As shown in FIG. 15B, if it is judged that the rectangle data 500 under processing of the present layer calculated at S155 do not coincide to the rectangle data 710A of the lower layer retained in the memory unit 11 at the judgment of S165 (in a case of "No"), the intermediate code producing unit 8 judges as to whether only the height information does not coincide to each other (or only the height information 512b and the height information 712b) (S305).

In a case that only the height information (or only the height information 512b and the height information 712b) does not coincide to each other at the judgment of S305 (or in a case of "Yes"), the intermediate code producing unit 8 calculates the difference between the rectangle data 710A of the lower layer and the rectangle data 500 under processing of the present layer calculated at S155 (S310).

The processing at S310 means to calculate the difference rectangle data 2110A (see FIG. 13(a)), serving as the drawing region 2110 as shown in FIG. 13 (b), indicating the position and size of the region of the difference between the lower divisional object 401 according to the rectangle data 710A of the lower layer and upper divisional object 402 according to the rectangle data 500 under processing of the present layer calculated at S155.

The intermediate code producing unit 8 at that time calculates the difference rectangle data 2110A, e.g., in the following way. The intermediate code producing unit 8 calculates the band X-coordinate information 711a of the rectangle data 710A as the band X-coordinate information 2111a indicating the X-coordinate of the origin O2110 of the drawing region 2110 (see FIG. 13(a) and FIG. 13(b)), based on the rectangle data 710A of the lower layer (see FIG. 9) retained in the memory unit 11.

The intermediate code producing unit 8 also calculates the height information 512b of the rectangle data 500 as the band Y-coordinate information 2111b indicating the Y-coordinate of the origin O2110 of the drawing region 2110 (see FIG. 13(a) and FIG. 13(b)), based on the rectangle data 500 (see FIG. 7) under processing of the present layer calculated at S155.

The intermediate code producing unit 8 further calculates the width information 712a of the rectangle data 710A as the width information 2112a of the drawing region 2110 (see FIG. 13(a) and FIG. 13(b)), based on the rectangle data 710A (see FIG. 9) of the lower layer retained in the memory unit 11.

The intermediate code producing unit 8 yet further calculates the difference between the height information 712b of the rectangle data 710A and the height information 512b of the rectangle data 500 as the height information 2112b of the drawing region 2110 (see FIG. 13(a) and FIG. 13(b)), based on the rectangle data 710A (see FIG. 9) of the lower layer retained in the memory unit 11 and the rectangle data 500 (see FIG. 7) under processing of the present layer calculated at S155.

The band X-coordinate information 2111a and the band Y-coordinate information 2111b form the intra-band origin coordinate information 2111 (see FIG. 13(a)) of the drawing region 2110. The width information 2112a and the height information 2112b form the size information 2112 (see FIG. 13(a)) of the drawing region. The intra-band origin coordinate information 2111 and the size information 2112 form the difference rectangle data 2110A of the drawing region 2110. Accordingly, the intermediate code producing unit 8 thus calculates the difference rectangle data 2110A.

After the step of S305, the intermediate code producing unit 8 converts the calculated difference rectangle data 2110A of the drawing region 2110 to the intermediate code 800 and stores as the rectangle data 802 (see FIG. 9) in the memory unit 11 in corresponding to the color setting information 801 of the lower divisional object 401 (S315).

The intermediate code producing unit 8 at that time changes the value of the retaining existence information 703 to the state of "not retaining" because the rectangle data 710A retained in the memory unit 11 are already converted to the intermediate code 800.

After the step S170, the intermediate code producing unit 8 clears the rectangle data 710A of the lower layer retained in the memory unit 11 (S320). Subsequently, the processing goes to S180.

If it is judged at the judgment of S305 that the height information only (the height information 512b and the height information 712b) does not coincide to one another (or in a case of "No"), the processing goes to S170. The cases that it is judged that the height information only (the height information 512b and the height information 712b) does not coincide to one another (or in a case of "No") are, (#1) that the positions of the upper divisional object 402 and the lower divisional object 401 coincide to one another but the height components do not coincide to one another, and (#2) that the positions of the upper divisional object 402 and the lower divisional object 401 do not coincide to one another.

The image processing apparatus 1B thus formed performs, from the bottommost layer to the topmost layer, processing in which the apparatus 1B produces, for each of the bands 300, the intermediate code 800 of the lower divisional object 401 whose position coincides to the position of the upper divisional object 402 but whose height component does not coincide to the height component of the upper divisional object 402, and the intermediate code 800 of the under divisional object 401 whose position does not coincide to the position of the upper divisional object 402, and omits production of the intermediate code 800 of the lower divisional object 401 in a case other than the above situations.

Accordingly, the image processing apparatus 1B omits production of the intermediate code 800 of a region (or the non-drawing region 1111) of the lower divisional object 401 hiding under the upper divisional object 402. The image processing apparatus 1B therefore can reduce the production time of the printing image data including the gradation pattern 1000.

In a case where it is judged that the rectangle data 500 under processing of the present layer calculated at S155 does not coincide to the rectangle data 710A of the lower layer retained in the memory unit 11 (in a case of "No") and where it is judged that only the height information (the height information 512b and the height information 712b only) does not coincide to one another (in a case of "Yes") at the judgment of S165, it is indicated that between the lower divisional object 401 and the upper divisional object 402, the coordinate of the origin O400 coincides to one another, and the length of the width coincides to one another, but the height component only does not coincide to one another.

In such a case (i.e., between the lower divisional object 401 and the upper divisional object 402, the coordinate of the origin O400 coincides to one another, and the length of the width coincides to one another), the image processing apparatus 1B can omit the drawing processing of the region of the lower divisional object 401 hiding under the upper divisional object 402 (e.g., the non-drawing region 1111 inside the lower divisional object 401g shown in FIG. 12) at a time producing the printing image data at S230. The image processing apparatus 1B therefore can reduce further the production time for the printing image data more than the image processing apparatus 1 according to the first embodiment.

As described above, according to the image processing apparatus 1B of the second embodiment, production of the intermediate code 800 of the rectangle drawing object 100 can be omitted where the prescribed conditions are satisfied, and therefore, the image processing apparatus 1B can reduce the production time of the printing image data including the gradation pattern 1000.

According to the image processing apparatus 1B, the drawing processing of the region of the lower divisional object 401 hiding under the upper divisional object 402 can be omitted, so that the image processing apparatus 1B can reduce further the production time for the printing image data more than the image processing apparatus 1 according to the first embodiment.

This invention is not limited to the embodiments described above but can be modified or changed in various ways as far as not departing from the inventive concept of the invention.

For example, this invention is applicable not only to printers but also to image processing apparatuses such as facsimile machines, photocopiers, MFPs, etc. The term of "MFPs" means multi-function printers in which facsimile function, scanning function, photocopying function, etc. are added to a printer.

In the first and second embodiments, the image processing apparatuses 1, 1B have the structure specifying the non-drawing region 1111 and omitting drawing processing of the non-drawing region 1111 because the height components of the rectangle drawing region 1010 (or the rectangle drawing object 100) of each layer are different in the gradation pattern 1000 in which the color changes in the height direction. The image processing apparatuses 1, 1B may have a structure specifying the non-drawing region 1111 and omitting drawing processing of the non-drawing region 1111 from different width components of the rectangle drawing region 1010 (or the rectangle drawing object 100) of each layer in a gradation pattern in which the color changes in a right and left direction.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An image processing apparatus producing image data, comprising:
   a language analyzing unit for analyzing a PDL command;
   a shape drawing unit, producing a shape drawing object based on a shape drawing command contained in the analyzed PDL command;
   an intermediate code producing unit, producing an intermediate code based on a position and a size of the shape drawing object; and
   an image data producing unit for producing the image data based on the intermediate code,
   wherein when a plurality of the shape drawing objects comprises a plurality of rectangle drawing objects provided as overlapping layers, ranging from a bottommost layer to a topmost layer, with each layer having a density different from each other layer for forming a gradation pattern, the intermediate code producing unit divides each rectangle drawing object and produces a plurality of divisional objects,
   wherein one of the plurality of divisional objects includes a lower divisional object, constituting a lower layer of the gradation pattern and an upper divisional object constituting an upper layer of the gradation pattern located above the lower layer, with the upper divisional object and the lower divisional object both being located within a prescribed pixel region such that the lower divisional object and the upper divisional object completely overlap and the lower divisional object is completely hidden under the upper divisional object, and wherein, at the prescribed pixel region, the intermediate code producing unit omits production of the intermediate code, corresponding to a region where the lower divisional object is completely hidden under the upper divisional object and the intermediate code producing unit produces the intermediate code, corresponding to another region of the lower divisional object, excluding the region of the lower divisional object that is completely hidden by the upper divisional object at the prescribed pixel region.

2. The image processing apparatus according to claim 1, wherein the lower divisional object that is completely hidden under the upper divisional object has both a position and a size coinciding to a position and a size of the upper divisional object within the prescribed pixel region, and wherein the lower divisional object has a region protruding from the upper divisional object with either or both the position and the size of the lower divisional object that does not coincide with the position and the size of the upper divisional object within the prescribed pixel region.

3. The image processing apparatus according to claim 1, wherein the intermediate code producing unit produces the intermediate code of the upper divisional object when the upper divisional object reaches the topmost layer during processing.

4. The image processing apparatus according to claim 1, wherein the intermediate code producing unit combines the produced intermediate codes at all of the layers at each prescribed pixel region, and wherein the image data producing unit produces the image data based on the combined intermediate codes.

5. The image processing apparatus according to claim 1, wherein the position of the divisional object within the prescribed pixel region is defined with an X-coordinate and a Y-coordinate of a point on an upper left corner of the divisional object with respect to a normal coordinate where the origin of the normal coordinate is set to a point of an upper left corner of the prescribed pixel region in which the divisional object exists.

6. The image processing apparatus according to claim 1, wherein the image data is printing image data used for printing, and further comprising an image printing unit for printing based on the printing image data.

7. A program tangibly embodied in and executed by a control unit included in an image processing apparatus to produce image data, the program functioning as and comprising:

a language analyzing unit for analyzing a PDL command;

a shape drawing unit, producing a shape drawing object based on a shape drawing command contained in the analyzed PDL command;

an intermediate code producing unit, producing an intermediate code based on a position and a size of the shape drawing object; and an image data producing unit for producing the image data based on the intermediate code, wherein when a plurality of the shape drawing objects comprises a plurality of rectangle drawing objects provided as overlapping layers, ranging from a bottommost layer to a topmost layer with each layer having a density different from each other layer for forming a gradation pattern, the intermediate code producing unit divides each rectangle drawing object and produces a plurality of divisional objects, wherein one of the plurality of divisional objects includes a lower divisional object, constituting a lower layer of the gradation pattern and an upper divisional object constituting an upper layer of the gradation pattern located above the lower layer, with the upper divisional object and the lower divisional object both being located within a prescribed pixel region such that the lower divisional object and the upper divisional object completely overlap and the lower divisional object is completely hidden bye upper divisional object, and wherein, at the prescribed pixel region, the intermediate code producing unit omits production of the lower divisional object, which is completely hidden under the upper divisional object and the intermediate code producing unit produces the lower divisional object such that a region of each lower divisional object protrudes from the upper divisional object at the prescribed pixel region.

* * * * *